United States Patent
Hashimoto et al.

(10) Patent No.: US 12,132,350 B2
(45) Date of Patent: Oct. 29, 2024

(54) STATOR ASSEMBLING METHOD AND STATOR ASSEMBLING APPARATUS

(71) Applicant: AISIN CORPORATION, Aichi (JP)

(72) Inventors: Shingo Hashimoto, Kariya (JP); Hiroyuki Tanaka, Kariya (JP); Mitsuhiro Ide, Kariya (JP)

(73) Assignee: AISIN CORPORATION, Kariya (JP)

( * ) Notice: Subject to any disclaimer, the term of this patent is extended or adjusted under 35 U.S.C. 154(b) by 406 days.

(21) Appl. No.: 17/437,739

(22) PCT Filed: Jun. 4, 2020

(86) PCT No.: PCT/JP2020/022191
§ 371 (c)(1),
(2) Date: Sep. 9, 2021

(87) PCT Pub. No.: WO2020/246559
PCT Pub. Date: Dec. 10, 2020

(65) Prior Publication Data
US 2022/0149675 A1 May 12, 2022

(30) Foreign Application Priority Data
Jun. 7, 2019 (JP) ................................. 2019-107342

(51) Int. Cl.
*H02K 1/16* (2006.01)
*H02K 15/06* (2006.01)
*H02K 15/10* (2006.01)

(52) U.S. Cl.
CPC ............. *H02K 1/16* (2013.01); *H02K 15/066* (2013.01); *H02K 15/10* (2013.01)

(58) Field of Classification Search
CPC ........ H02K 1/16; H02K 15/066; H02K 15/10; H02K 15/085
See application file for complete search history.

(56) References Cited

U.S. PATENT DOCUMENTS

| 7,788,790 | B2 | 9/2010 | Neet | |
| 2016/0233749 | A1* | 8/2016 | Ueno | .................. H02K 15/067 |
| 2017/0141659 | A1 | 5/2017 | Hashimoto et al. | |
| 2020/0076280 | A1* | 3/2020 | Yoshida | .............. H02K 15/024 |
| 2020/0220438 | A1 | 7/2020 | Ide et al. | |

FOREIGN PATENT DOCUMENTS

| JP | 2016-127692 A | 7/2016 |
| WO | 2015/186835 A1 | 12/2015 |
| WO | 2019/031573 A1 | 2/2019 |

OTHER PUBLICATIONS

Aug. 18, 2020 International Search Report issued in International Patent Application No. PCT/JP2020/022191.

* cited by examiner

*Primary Examiner* — Burton S Mullins
(74) *Attorney, Agent, or Firm* — Oliff PLC

(57) ABSTRACT

The stator assembling method includes: the step of disposing a guide to restrict circumferential movement of opening jigs inserted into slots; and the step of moving coils and the opening jigs together to a second side in a radial direction relative to a stator core while guiding the opening jigs such that circumferential movement of the opening jigs is restricted by the guide, thus inserting slot-housed portions into the slots.

16 Claims, 13 Drawing Sheets

STATOR ASSEMBLING METHOD AND STATOR ASSEMBLING APPARATUS

TECHNICAL FIELD

The present disclosure relates to stator assembling methods and stator assembling apparatuses.

BACKGROUND ART

Methods for assembling stators having insulating members disposed in slots and apparatuses for assembling the stators are known in the related art. Such stator assembling method and stator assembling apparatus are disclosed, for example, in WO 2019/031573.

The stator assembling method described in WO 2019/031573 includes the step of inserting, along a central axis direction of a stator core, guide jigs (opening jigs) inside sheet-shaped insulating members disposed in slots. WO 2019/031573 further describes the step of moving the guide jigs, which are inserted inside the insulating members, radially outward together with coils provided radially inward of the guide jigs, thus inserting the coils into the slots while opening the insulating members by the guide jigs.

RELATED ART DOCUMENTS

Patent Documents

Patent Document 1: WO 2019/031573

SUMMARY OF THE DISCLOSURE

Problem to be Solved by the Disclosure

When the guide jigs (opening jigs) are moved radially outward, however, the stator assembling method described in WO 2019/031573 may cause the guide jigs to move while coming into contact with the insulating members (or while pressing the insulating members) if, for example, the guide jigs deviate in position in a circumferential direction or the guide jigs incline relative to the central axis direction. In this case, the insulating members may be broken or the insulating members may be jammed between the guide jigs and teeth during movement of the guide jigs. Thus, the stator assembling method described in WO 2019/031573 may cause a stator insulation failure resulting from breakage and jamming of the insulating members. Accordingly, what is desired is a stator assembling method and a stator assembling apparatus that are able to prevent occurrence of a stator insulation failure resulting from breakage and jamming of the insulating members. When the insulating members are jammed between the guide jigs and the teeth, the teeth will have portions not covered with the insulating members, resulting in occurrence of a stator insulation failure.

This disclosure has been made to solve the above-described problems, and an object of this disclosure is to provide a stator assembling method and a stator assembling apparatus that are able to prevent occurrence of a stator insulation failure resulting from breakage and jamming of insulating members caused by opening jigs.

Means for Solving the Problem

To achieve the above object, a stator assembling method according to a first aspect of the disclosure is a method for assembling a stator that includes: a stator core including a back yoke, teeth extending to a first side in a radial direction from the back yoke, and slots each defined between adjacent ones of the teeth and each including an opening on the first side in the radial direction; coils including slot-housed portions each housed in an associated one of the slots; and insulating members each disposed in an associated one of the slots such that the insulating members are located between inner wall surfaces of the slots facing in a circumferential direction and the slot-housed portions. The stator assembling method includes: a step of disposing each of the insulating members in an associated one of the slots; a step of inserting, after the step of disposing the insulating members, opening jigs into the slots such that each insulating member is disposed between the inner wall surface of the associated slot and an associated one of the opening jigs, thus opening a portion of each insulating member on the first side in the radial direction; a step of disposing a guide such that the guide is adjacent to the stator core in an axial direction of the stator core, the guide restricting movement of the opening jigs in the circumferential direction; and a step of moving, after the step of opening the insulating members, the coils and the opening jigs together to a second side in the radial direction relative to the stator core while guiding the opening jigs such that movement of the opening jigs in the circumferential direction is restricted by the guide, thus inserting the slot-housed portions into the slots through the openings.

As described above, the stator assembling method according to the first aspect of the disclosure involves disposing the guide to restrict movement of the opening jigs in the circumferential direction, such that the guide is adjacent to the stator core in the axial direction of the stator core. This makes it possible to prevent the opening jigs from coming into contact with the insulating members disposed in the slots, because movement of the opening jigs in the circumferential direction is restricted by the guide. Accordingly, the stator assembling method is able to prevent the insulating members from being broken by the opening jigs and prevent the insulating members from being jammed between the opening jigs and the teeth. Consequently, the stator assembling method is able to prevent occurrence of a stator insulation failure resulting from breakage and jamming of the insulating members.

A stator assembling apparatus according to a second aspect of the disclosure is an apparatus for assembling a stator that includes: a stator core including a back yoke, teeth extending to a first side in a radial direction from the back yoke, and slots each defined between adjacent ones of the teeth and each including an opening on the first side in the radial direction; coils including slot-housed portions each housed in an associated one of the slots; and insulating members each disposed in an associated one of the slots such that the insulating members are located between inner wall surfaces of the slots facing in a circumferential direction and the slot-housed portions. The stator assembling apparatus includes: opening jigs structured to be movable to a second side in the radial direction together with the coils through regions of the slots opposite to the inner wall surfaces relative to the insulating members, the opening jigs opening portions of the insulating members on the first side in the radial direction by being inserted into the slots; and a guide to be disposed adjacent to the stator core in an axial direction of the stator core. The guide is provided such that movement of the opening jigs in the circumferential direction is restricted.

As described above, the stator assembling apparatus according to the second aspect of the disclosure includes the guide structured to restrict movement of the opening jigs in the circumferential direction. This makes it possible to prevent the opening jigs from coming into contact with the insulating members disposed in the slots. Accordingly, the stator assembling apparatus is able to prevent the insulating members from being broken by the opening jigs and prevent the insulating members from being jammed between the opening jigs and the teeth. Consequently, the second aspect of the disclosure is able to provide the stator assembling apparatus capable of preventing occurrence of a stator insulation failure resulting from breakage and jamming of the insulating members.

Effects of the Disclosure

As described above, the present disclosure is able to prevent occurrence of a stator insulation failure resulting from breakage and jamming of insulating members caused by opening jigs.

MODES FOR CARRYING OUT THE DISCLOSURE

Embodiments of the present disclosure will be described below with reference to the drawings.

Structure of Present Embodiment

Structure of Stator

Figure 1:
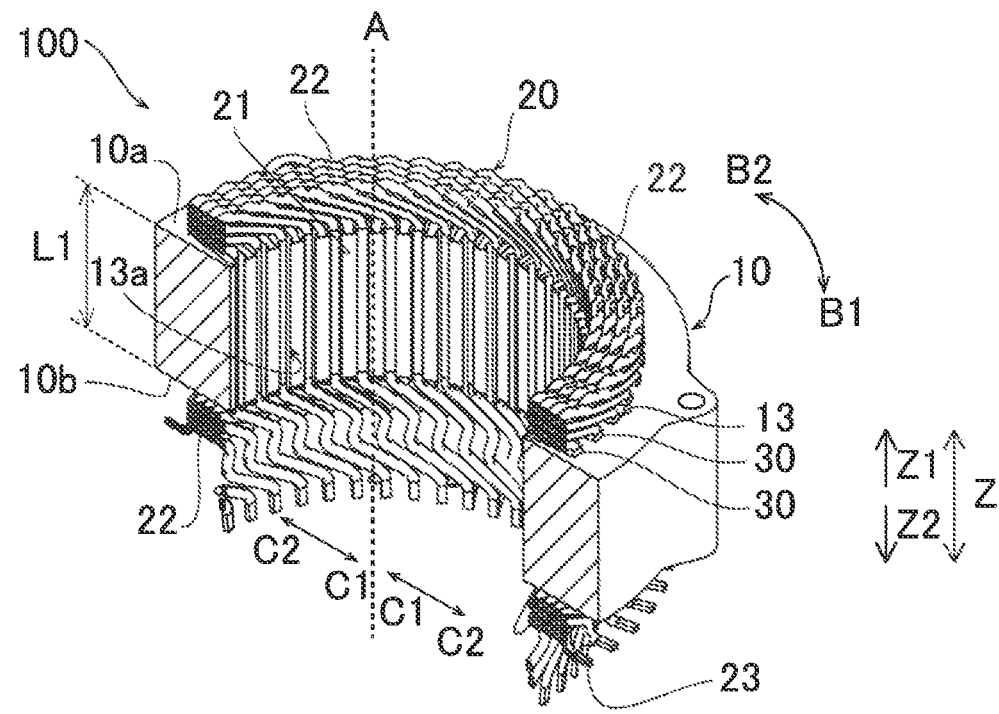
FIG. 1 is an oblique cross-sectional view of a stator according to one embodiment.

Referring to FIGS. 1 to 4, a structure of a stator 100 according to the present embodiment will be described. Although FIG. 1 illustrates an oblique cross-sectional view of the stator 100 (which is in the form of a semicircular shape), the stator 100 has an annular shape.

As used herein, the terms "central axis direction" and "axial direction" each refer to a direction (direction Z) along a central axis A (rotor rotation axis) of a stator core 10 (or the stator 100) illustrated in FIG. 1. The term "circumferential direction" refers to a circumferential direction (direction B1 or direction B2) of the stator core 10. The term "radial direction" refers to a radial direction of the stator core 10. The term "radially inner side" refers to a direction (direction C1) toward the center of the stator core 10. The term "radially outer side" refers to a direction (direction C2) outward from the stator core 10. The radially inner side is an example of a "first side in a radial direction" in the claims. The radially outer side is an example of a "second side in the radial direction" in the claims.

As illustrated in FIG. 1, the stator 100 in the present embodiment includes: the stator core 10 including slots 13 each having an opening 13a defined between two adjacent teeth 12 on the radially inner side; coils 20 including slot-housed portions 21 housed in the slots 13; and insulating sheets 30 each disposed between the associated slot 13 and the associated slot-housed portion 21. Each insulating sheet 30 is an example of an "insulating member" in the claims.

Figure 2:
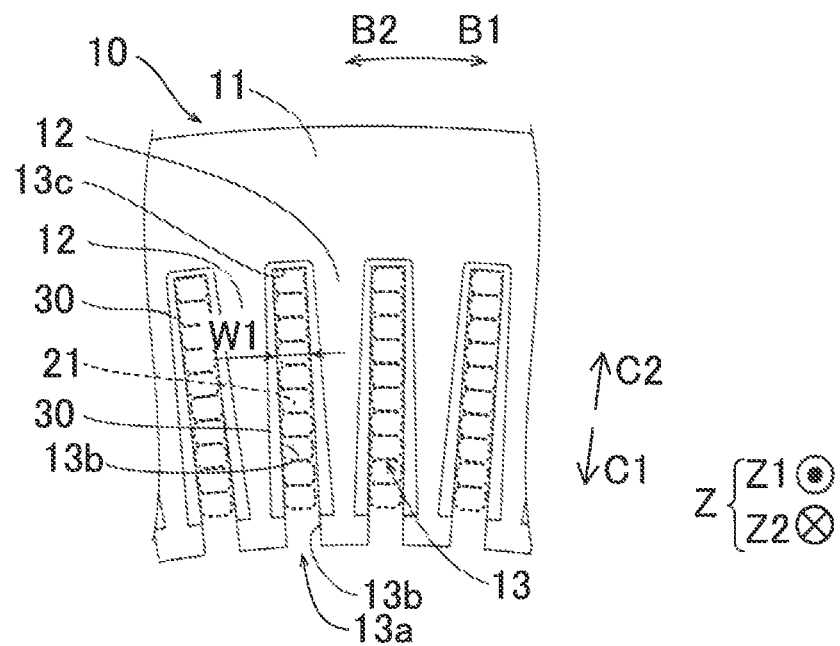
FIG. 2 is a partially enlarged view of the stator according to one embodiment as viewed in an axial direction of the stator.

As illustrated in FIG. 2, the stator core 10 includes a back yoke 11 and the teeth 12 extending radially inward from the back yoke 11. The teeth 12 are disposed at equiangular intervals in the circumferential direction of the stator core 10. The slots 13 are each defined between adjacent two of the teeth 12. The slots 13 house the slot-housed portions 21 of the coils 20 so as to hold the coils 20. The slots 13 are arranged circumferentially on the radially inner side of the stator core 10. The slots 13 are formed such that each slot 13 has a substantially uniform circumferential width W1 at any radial position. The term "width W1" refers to a distance between inner wall surfaces 13b of each slot 13 in the circumferential direction. Although the present embodiment illustrates an example where the width W1 is constant in the radial direction, the present disclosure is not limited to this example. The width W1 may vary in the radial direction. For example, the width W1 may decrease toward the radially inner side. The width W1 is an example of a "first width" in the claims.

Figure 3:
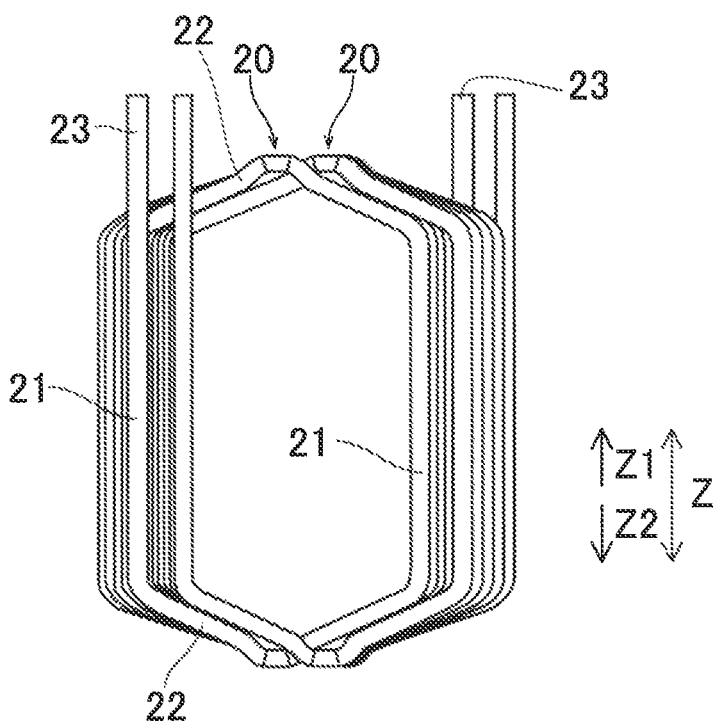
FIG. 3 is a side view of coils according to one embodiment.

Each coil 20 includes a rectangular conductor having a substantially rectangular cross section. As illustrated in FIG. 3, each coil 20 is in the form of a ring by winding the rectangular conductor more than once such that the rectangular conductor is formed into a predetermined shape (e.g., a hexagonal shape or an octagonal shape). The coils 20 are disposed in the circumferential direction relative to the slots 13 of the stator 100. The coils 20 are arranged circumferentially such that the coils 20 form an annular shape (see FIG. 1) along the inner periphery of the stator core 10 as a whole.

Each coil 20 includes a pair of the slot-housed portions 21 to be housed in different ones of the slots 13 of the stator core 10 having an annular shape. Each coil 20 includes a pair of coil end portions 22 continuous with an associated pair of the slot-housed portions 21 and disposed outward of the slots 13 in the axial direction. The coils 20 include lead wire portions 23 extending from the slot-housed portions 21.

Each slot-housed portion 21 has a substantially linear shape. The slot-housed portions 21 are disposed to extend from a first end face 10a of the stator core 10 to a second end face 10b thereof in the axial direction through different ones of the slots 13. Each coil end portion 22 is provided by being bent to form a substantially triangular shape as viewed from the radially inner side. As illustrated in FIG. 1, one of each pair of coil end portions 22 is disposed outward of the first end face 10a of the stator core 10, and the other one of each pair of coil end portions 22 is disposed outward of the second end face 10b of the stator core 10.

As illustrated in FIG. 2, the insulating sheets 30 are disposed along the inner wall surfaces 13b of the slots 13 facing in the circumferential direction and along inner wall surfaces 13c of the slots 13 located on the radially outer side. Specifically, the insulating sheets 30 are disposed in the slots 13 so as to be located between the inner wall surfaces (13b, 13c) of the slots 13 and the slot-housed portions 21. The insulating sheets 30 have the function of insulating the coils 20 from the slots 13. Each insulating sheet 30 is made of, for example, Nomex®, Kapton®, or a combination thereof. Nomex is fiber (or paper) made of aramid polymer. Each insulating sheet 30 may include: a core made of a PEN (polyethylene naphthalate) film; and a surface member made of aramid fiber and provided to cover both sides of the core.

Figure 4:
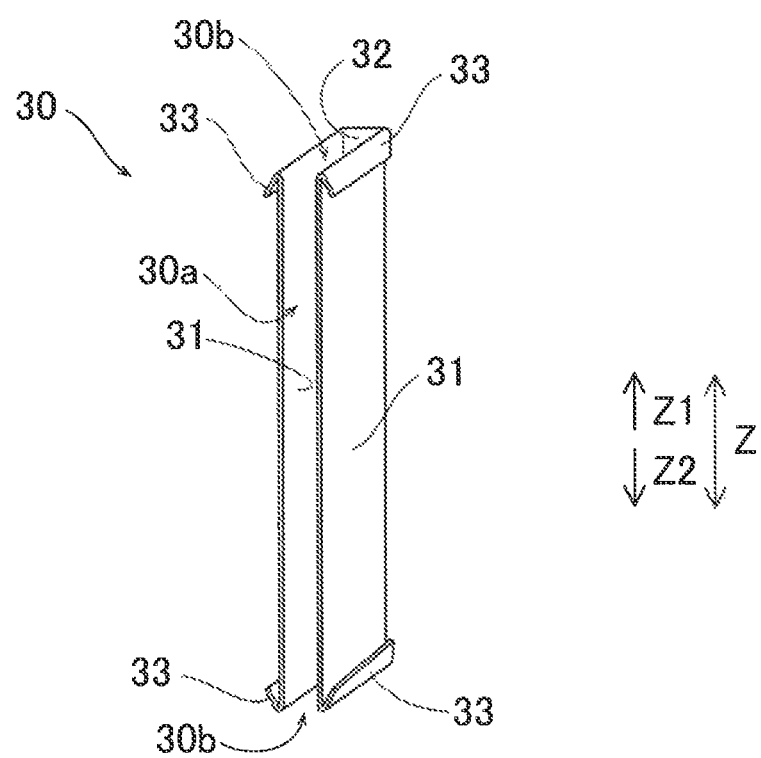
FIG. 4 is a perspective view of an insulating sheet according to one embodiment.

As illustrated in FIG. 4, each insulating sheet 30 has a shape extending along the inner wall surfaces 13b and 13c of the associated slot 13. Specifically, each insulating sheet 30 is formed such that each insulating sheet 30 is substantially U-shaped as viewed in the axial direction and has a substantially rectangular shape as viewed in the circumferential direction. The substantially U-shaped insulating sheets 30 are formed such that each insulating sheet 30 is bent from a flat-shaped state. Each insulating sheet 30 includes: side walls 31 that come into contact with the inner wall surfaces 13b of the associated slot 13; a back wall 32 that comes into contact with the associated inner wall surface 13c; and collar-shaped portions 33 each disposed outward of the associated slot 13 in the axial direction and having a collar shape (folded shape). Each insulating sheet 30 includes: a radial opening 30a open to the radially inner side; and axial openings 30b located on both sides in the axial direction. The side walls 31, the back wall 32, and the collar-shaped portions 33 are continuous with each other.

Each radial opening 30a is an example of a "portion on the first side in the radial direction" in the claims.

Structure of Stator Assembling Apparatus

Referring to FIG. 1 and FIGS. 5 to 14, a structure of an assembling apparatus 200 for the stator 100 according to the present embodiment will be described below. The assembling apparatus 200 for the stator 100 according to the present embodiment is the assembling apparatus 200 for assembling the stator 100 (see FIG. 1) including: the stator core 10 including the slots 13 with the radial openings 30a; the coils 20 including the slot-housed portions 21 each housed in an associated one of the slots 13; and the insulating sheets 30 each disposed between an associated one of the slots 13 and an associated one of the slot-housed portions 21.

Structure of Insulating Member Opener

Figure 5:
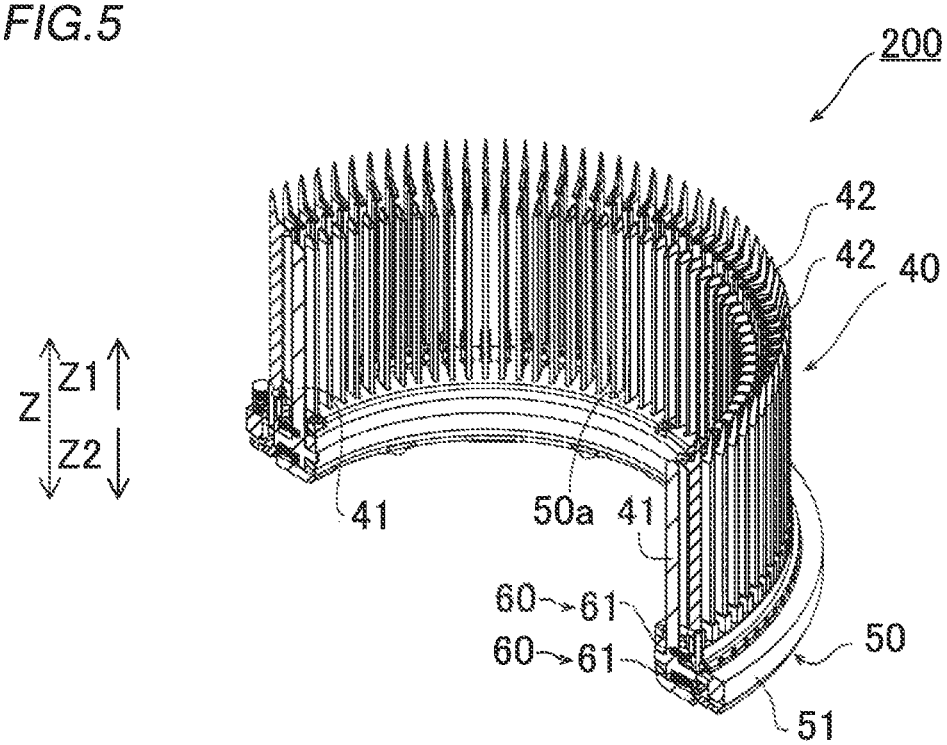
FIG. 5 is an oblique cross-sectional view of an insulating member opener according to one embodiment.

As illustrated in FIG. 5, the assembling apparatus 200 includes an insulating member opener 40. The insulating member opener 40 is structured to open the radial openings 30a of the insulating sheets 30. Specifically, the insulating member opener 40 includes first opening jigs 41, second opening jigs 42, a base 50, and urgers 60. For example, the number of first opening jigs 41 provided and the number of second opening jigs 42 provided are each equal to the number of slots 13. The first opening jigs 41 and the second opening jigs 42 are disposed at equiangular intervals on the base 50 having an annular shape. Each first opening jig 41 is an example of an "opening jig" in the claims.

Structure of First Opening Jig and Base

Figure 6:
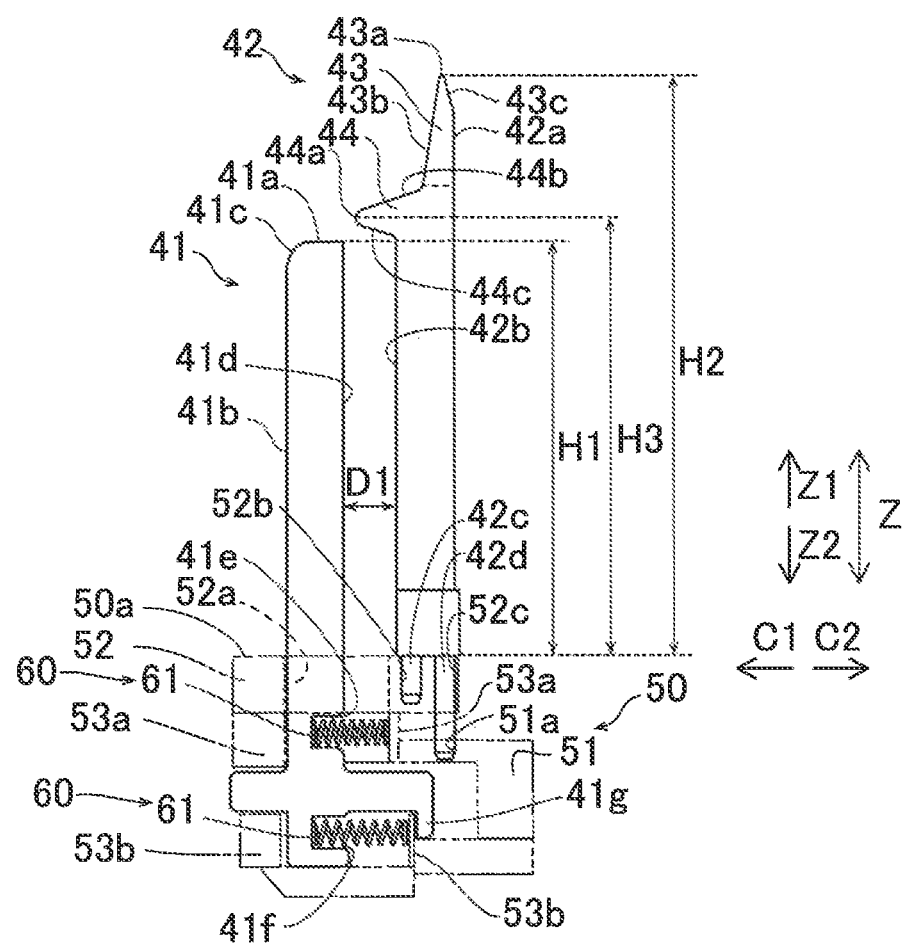
FIG. 6 is a side view illustrating structures of a first opening jig, a second opening jig, and a base according to one embodiment.

Each first opening jig 41 has a flat plate shape. As illustrated in FIG. 6, the first opening jigs 41 are provided such that each first opening jig 41 protrudes in the direction of an arrow Z1 from an upper end 50a of the base 50. For example, a protrusion height H1 of each first opening jig 41 is greater than a length (height) L1 (see FIG. 1) measured between the end faces 10a and 10b of the stator core 10. Thus, when the first opening jigs 41 are disposed in the slots 13, a tip 41a of each first opening jig 41 protrudes from the end face 10a of the stator core 10. The protrusion height H1 is a length measured from the upper end 50a of the base 50 to the tip 41a of each first opening jig 41.

Figure 7A:
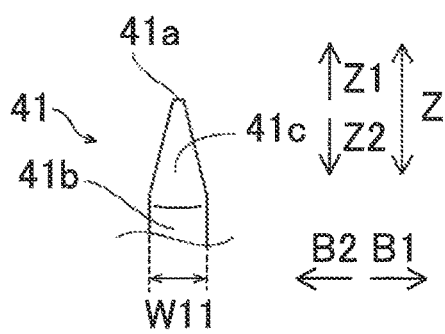
FIG. 7 provides diagrams for describing tapered shapes of the first opening jig (FIG. 7A) and the second opening jig (FIG. 7B) according to one embodiment.

The tip 41a and a radially inner side end 41b of each first opening jig 41 are smoothly connected through an arc-shaped portion 41c. As illustrated in FIG. 7A, each first opening jig 41 tapers toward the tip 41a.

As illustrated in FIG. 6, a radially outer side end 41d of each first opening jig 41 and a radially inner side end 42b of each second opening jig 42 are disposed at a distance D1 from each other. A portion of each first opening jig 41 disposed inside the base 50 is provided with a recess 41e and a recess 41f recessed to the radially inner side. Elastic members 61 of the urgers 60 (which will be described below) are disposed in the recesses 41e and the recesses 41f. Each first opening jig 41 is provided with an engagement portion 41g that comes into engagement with the base 50.

Figure 8:
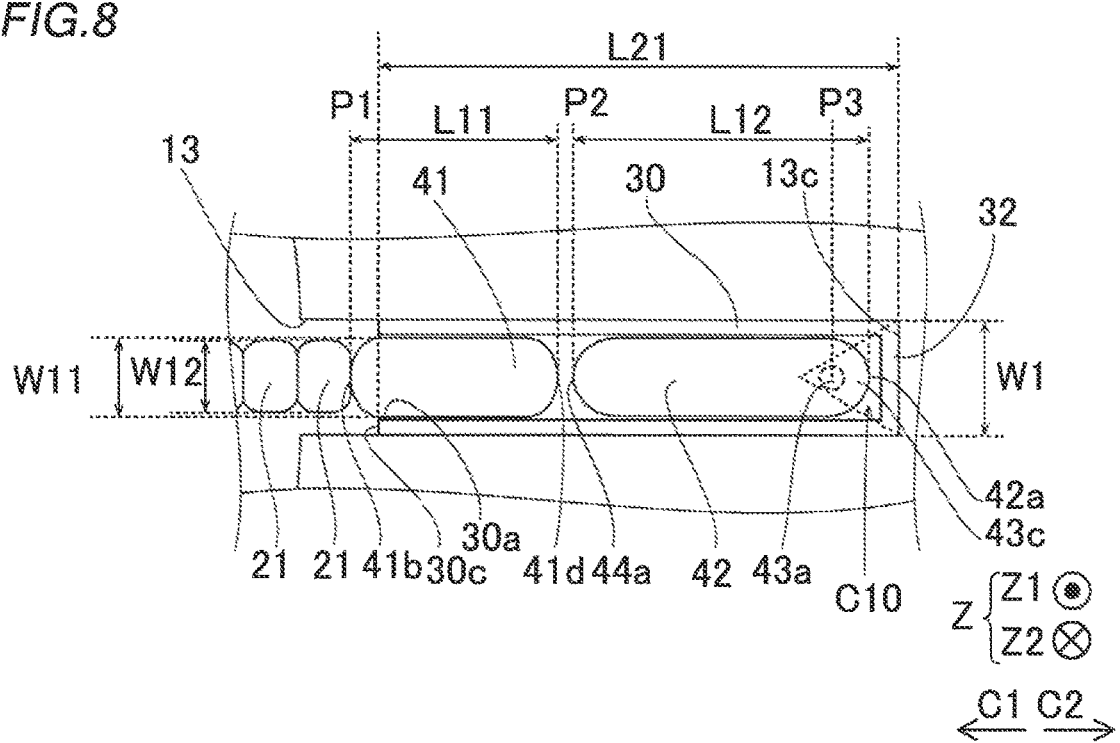
FIG. 8 is a diagram for describing a state where the first opening jig and the second opening jig according to one embodiment are disposed in a slot.

As illustrated in FIG. 8, each first opening jig 41 has an elliptical shape (or a rectangular shape) as viewed in the axial direction. For example, a radial length measured between the radially inner side end 41b and radially outer side end 41d of each first opening jig 41 is indicated by L11. For example, a circumferential width W11 of each first opening jig 41 is smaller than the width W1 of each slot 13 and larger than a width W12 of each slot-housed portion 21. The radially inner side end 41b of each first opening jig 41 is disposed at substantially the same radial position as a radially inner side end 30c of each insulating sheet 30 or disposed at a radial position P1 that is a radial position radially inward of the end 30c. FIG. 8 illustrates the case where the end 41b is disposed at the radial position P1 radially inward of the end 30c. The width W11 is an example of a "third width" in the claims.

The first opening jigs 41 are structured to be movable in the axial direction and radial direction of the stator core 10. Each first opening jig 41 is structured such that each first opening jig 41 inserted inside the associated insulating sheet 30 (which is disposed in the associated slot 13) along the axial direction opens the radial opening 30a of the associated insulating sheet 30. In other words, each first opening jig 41 is inserted into a region of an associated one of the slots 13 opposite to the inner wall surfaces 13b relative to the associated insulating sheet 30. Each first opening jig 41 is structured to move to the radially outer side relative to the stator core 10 together with the associated coil 20 while being in contact with the associated slot-housed portion 21.

Specifically, as illustrated in FIG. 6, movement of the base 50 in the axial direction, with the first opening jigs 41 disposed on the base 50, causes the first opening jigs 41 to move in the axial direction. The base 50 includes a radially outer base 51, upper bases 52, lower bases 53a, and lower bases 53b. The radially outer base 51 is disposed radially outward of the first opening jigs 41. A fixed portion 42d of each second opening jig 42 (which will be described below) is fixed to the radially outer base 51.

Figure 9A:
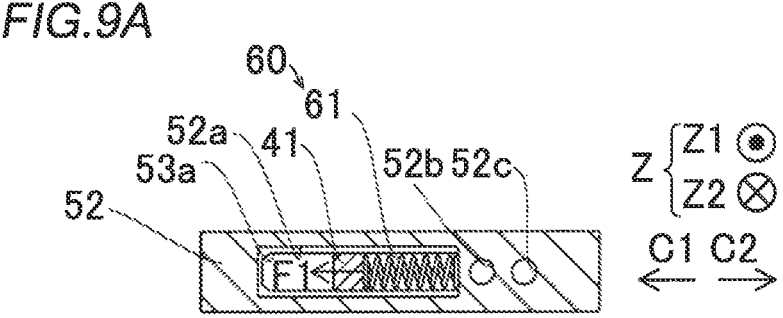
FIG. 9 provides diagrams illustrating structures of the base (FIG. 9A) and an urger (FIG. 9B) according to one embodiment as viewed in the axial direction.

As illustrated in FIG. 9A, each upper base 52 is provided with a hole 52a in which the associated first opening jig 41 is disposed. A radial opening width of each hole 52a is larger than the radial length L11 (see FIG. 8) of each first opening jig 41. Thus, the radial position of each first opening jig 41 is changeable while the circumferential position of each first opening jig 41 is fixed. Each elastic member 61 is disposed between the inner wall of the associated lower base 53a and the recess 41e (see FIG. 6) of the associated first opening jig 41. Each elastic member 61 is disposed between the inner wall of the associated lower base 53b and the recess 41f (see FIG. 6) of the associated first opening jig 41.

Figure 9B:
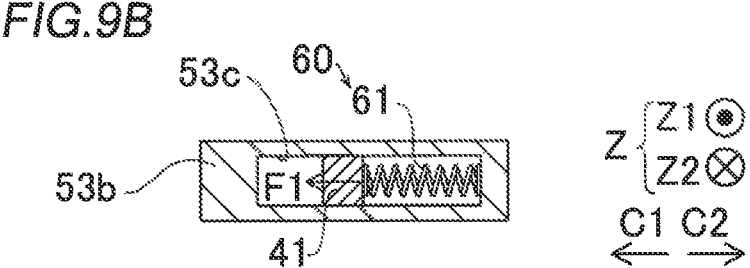

As illustrated in FIG. 9B, the urgers 60 including the elastic members 61, the lower bases 53a, and the lower bases 53b are structured to urge the first opening jigs 41 to the radially inner side. Specifically, each elastic member 61 is structured to elastically deform in the radial direction. Each elastic member 61 is, for example, a spring member. The elastic members 61 in a compressed and deformed state are disposed on the lower bases 53a and 53b. The elastic members 61 are structured to urge the recess 41e and the recess 41f of the associated first opening jig 41 to the radially inner side, assuming that an expanding force of each elastic member 61 is an urging force F1.

Figure 10:
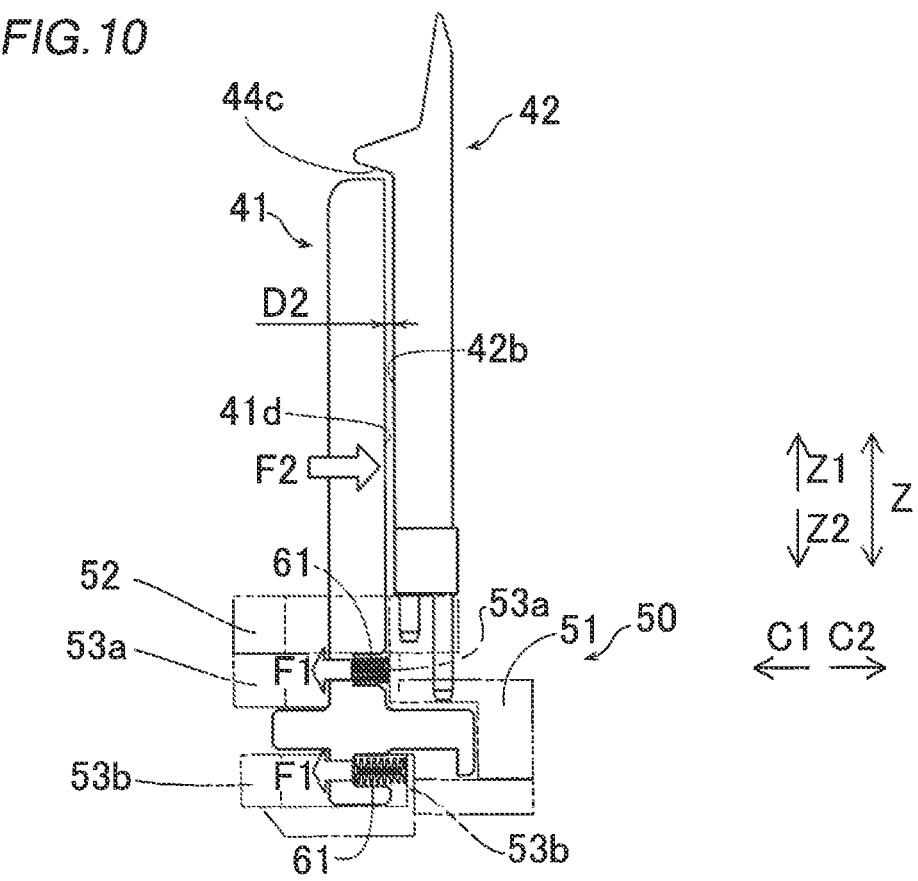
FIG. 10 is a diagram for describing the states of the first opening jig and the second opening jig after movement of the first opening jig according to one embodiment.
Figure 11:
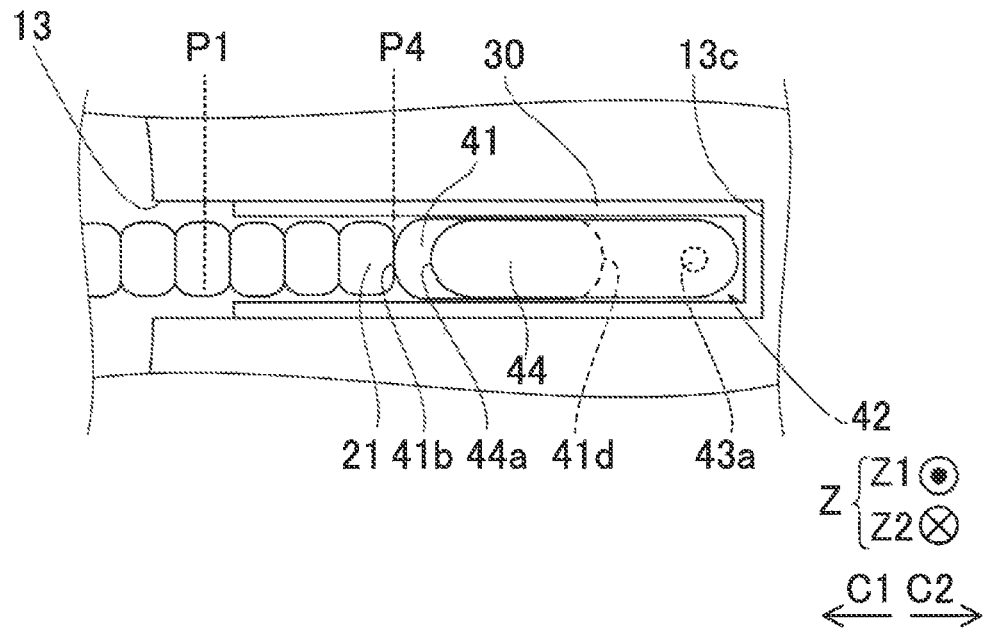
FIG. 11 is a diagram of the slot as viewed in the axial direction after movement of the first opening jig according to one embodiment.

Thus, as illustrated in FIG. 6, each first opening jig 41 is structured to move to a position on the radially inner side inside the associated hole 52a when the first opening jig 41 is urged radially inward by the associated urgers 60 including the elastic members 61 and no force that acts against the urging force F1 is applied to the first opening jig 41. Specifically, the radially inner side end 41b of each first opening jig 41 will be disposed at the radial position P1 (see FIG. 8). As illustrated in FIG. 10, each first opening jig 41 is structured to move to a radial position on the radially outer side when a force (pressing force F2) that acts against the urging force is applied to the first opening jig 41 toward the radially outer side. For example, as illustrated in FIG. 11, the end 41b of each first opening jig 41 will be disposed at a radial position P4 located on the radially outer side relative to the radial position P1.

Structure of Second Opening Jig

As illustrated in FIG. 5, each second opening jig 42 has a flat plate shape. Each second opening jig 42 is disposed to protrude from the upper end 50a of the base 50 at a radial position located on the radially outer side relative to the associated first opening jig 41. As illustrated in FIG. 6, a protrusion height H2 of each second opening jig 42 from the base 50 is greater than the protrusion height H1 of each first opening jig 41 in the axial direction. The protrusion height H2 of each second opening jig 42 means a length measured from the upper end 50a of the base 50 to a tip 43a of each second opening jig 42.

Figure 7B:
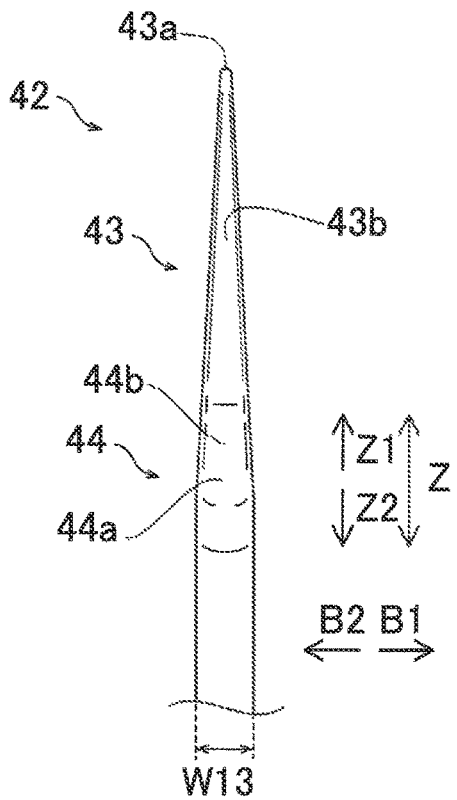

Each second opening jig 42 includes: a first portion 43 that is a portion located in the direction of the arrow Z1 and including the tip 43a; and a second portion 44 that is a portion located closer to the root (or closer to the base 50) than the first portion 43. The first portion 43 has a tapered shape in the radial direction and the circumferential direction. Specifically, as illustrated in FIG. 6, a radially outer side end 42a of each second opening jig 42 is formed to extend along the axial direction. An inclined portion 43b and an inclined portion 43c are defined adjacent to the tip 43a such that the radial positions of the inclined portions 43b and 43c are closer to each other toward the tip 43a. As illustrated in FIG. 7B, the second portion 44 of each second opening jig 42 has a circumferential width W13, and the first portion 43 of each second opening jig 42 is formed such that the circumferential width of the first portion 43 gradually decreases across the tip 43a. The circumferential width W13 of each second opening jig 42 is smaller than the circumferential width W11 of each first opening jig 41. A gap C10 (see FIG. 8) is created between the radially outer side end 42a of each second opening jig 42 and the back wall 32 of the associated insulating sheet 30.

As illustrated in FIG. 6, the second portion 44 is formed to protrude to the radially inner side. Specifically, a radial position P2 (see FIG. 8) of an end 44a of the second portion 44 is located radially inward of a radial position P3 of the tip 43a of the first portion 43 and radially outward of the radial position P1 of the end 41b of the first opening jig 41. The second portion 44 tapers from its radially outer side portion to the radially inner side end 44a. Specifically, the radially inner side end 42b of a portion of each second opening jig 42 closer to the root than the second portion 44 is located radially outward of the radial position P2 of the radially inner side end 44a of the second portion 44. A protrusion height H3 of the end 44a is greater than the protrusion height H1 of the first opening jig 41 and smaller than the protrusion height H2 of the tip 43a in the axial direction. Thus, as illustrated in FIG. 11, the first opening jig 41 is disposed to partially overlap with the second portion 44 as viewed in the axial direction when the first opening jig 41 has moved to the radial position P4 on the radially outer side.

Each second opening jig 42 is fixed to the base 50. Specifically, each second opening jig 42 is provided with a fixed portion 42c and the fixed portion 42d. The fixed portion 42c and the fixed portion 42d are structured such that the fixed portion 42c and the fixed portion 42d are fitted to a fitting portion 51a of the radially outer base 51 and a hole 52b and a hole 52c of the upper base 52. This fixes the radial position and circumferential position of each second opening jig 42. Movement of the base 50 in the axial direction causes the first opening jigs 41 and the second opening jigs 42 to move together in the axial direction. Specifically, the base 50 is structured to be movable along the axial direction relative to the stator core 10 together with the first opening jigs 41 and the second opening jigs 42. Thus, the second opening jigs 42 are structured such that the second opening jigs 42 are inserted into the slots 13 along the axial direction.

As illustrated in FIG. 8, each second opening jig 42 has a length L12 in the radial direction. For example, the length L12 is set to be longer than one-half of a length L21 measured between the radially outer side end (back wall 32) and the radially inner side end 30*c* of each insulating sheet 30. Thus, with each second opening jig 42 disposed in the associated slot 13, the radial position P2 is located radially inward of the radial center of the associated insulating sheet 30. The radial position P3 of the tip 43*a* of each second opening jig 42 is disposed within an equilateral triangle, one side of which is the inner wall surface 13*c* of the associated slot 13. For example, the radial position P3 of the tip 43*a* is located within a distance measured from the inner wall surface 13*c* and corresponding to one-fifth of the length L21.

Structure of Guide

Figure 12:
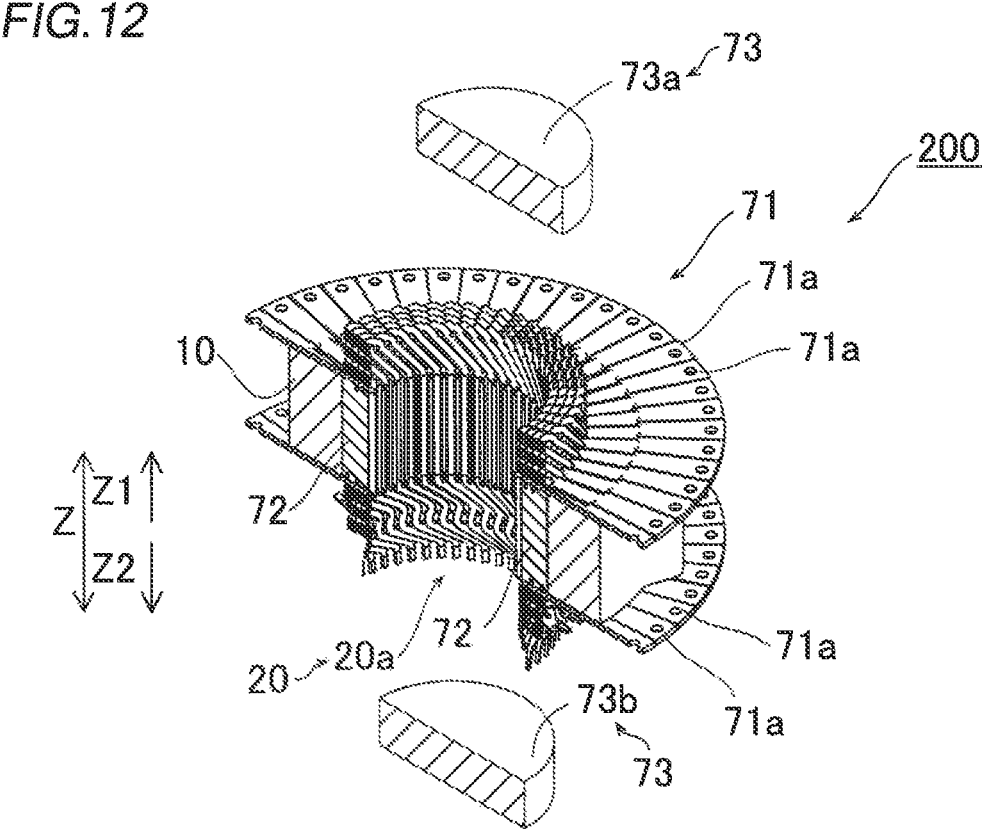
FIG. 12 is a perspective view illustrating structures of a first guide and a second guide included in a guide according to one embodiment.

As illustrated in FIG. 12, the assembling apparatus 200 for the stator 100 includes a first guide 71 and a second guide 72. The first guide 71 and the second guide 72 are structured such that the coils 20 and the first opening jigs 41 are moved together to the radially outer side relative to the stator core 10, with the slot-housed portions 21 in contact with the first opening jigs 41, thus allowing the slot-housed portions 21 to be inserted into the slots 13 through the openings 13*a*. The first guide 71 is an example of a "guide" in the claims.

Specifically, the first guide 71 and the second guide 72 are structured to guide the coils 20 when the coils 20 are inserted into the slots 13. The first guide 71 is provided on a first axial side and a second axial side of the stator core 10. In other words, the first guide 71 (including guide members 71*a* described below) is provided on the first end face 10*a* and the second end face 10*b* of the stator core 10. The second guide 72 is disposed radially inward of the teeth 12 of the stator core 10. For the sake of simplification, the second guide 72 is not illustrated in the drawings other than FIG. 12.

Figure 13:
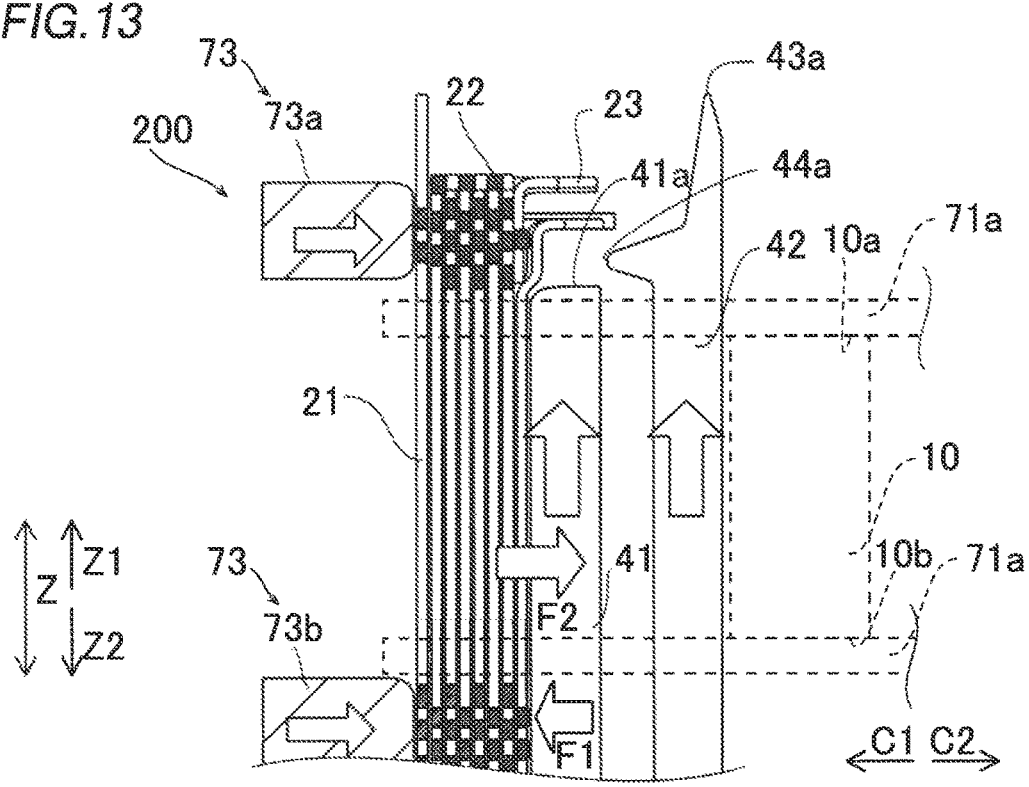
FIG. 13 is a diagram for describing pressers of the guide according to one embodiment.

As illustrated in FIG. 13, pressers 73 are structured to press the slot-housed portions 21 to the first opening jigs 41 toward the radially outer side against the urging force F1 of the urgers 60. Specifically, each presser 73 includes: a first presser 73*a* disposed radially inward of the coil end portion 22 located on the first axial side (i.e., located in the direction of the arrow Z1); and a second presser 73*b* disposed radially inward of the coil end portion 22 located on the second axial side (i.e., located in the direction of an arrow Z2).

Figure 14:
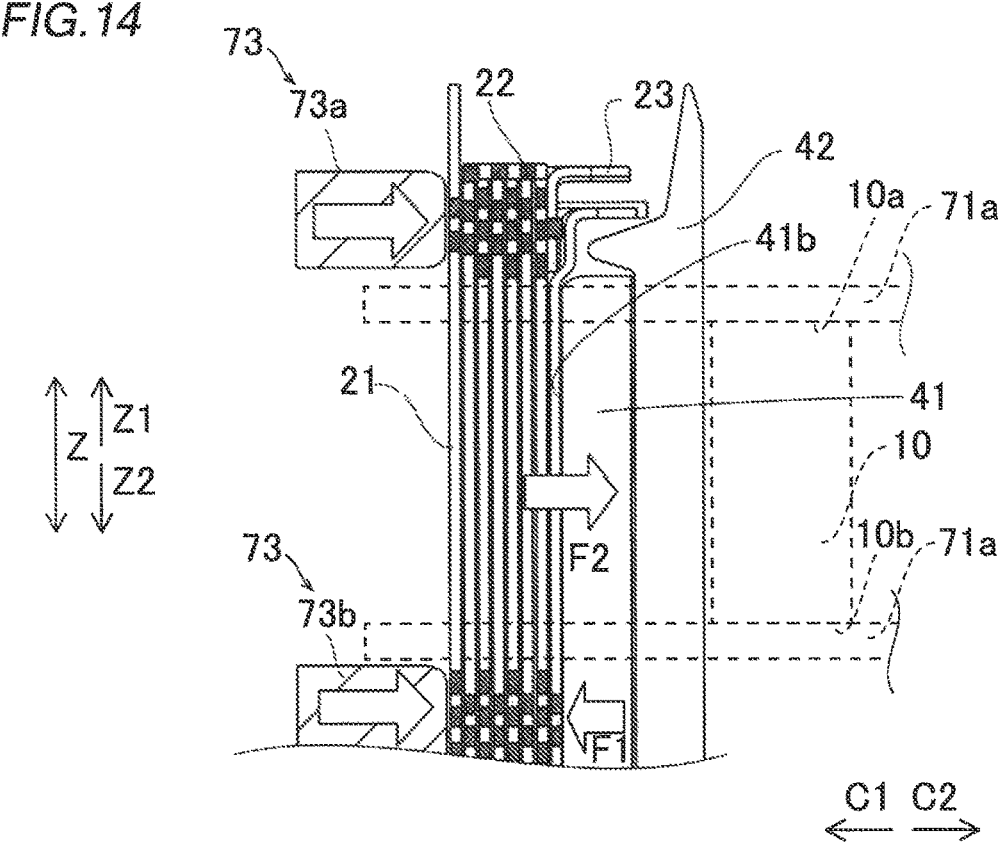
FIG. 14 is a diagram for describing the step of inserting the coils according to one embodiment into the slots.

The first and second pressers 73*a* and 73*b* are structured to press the coil end portions 22 of the coils 20 (i.e., a coil assembly 20*a*) from the radially inner side to the radially outer side. Thus, the slot-housed portions 21 continuous with the coil end portions 22 move radially outward, so that the slot-housed portions 21 come into contact with the first opening jigs 41. As previously mentioned, the urging force F1 of the urgers 60 is applied to the first opening jigs 41 toward the radially inner side. As illustrated in FIG. 14, the pressers 73 apply the pressing force F2, which exceeds the urging force F1, to the first opening jigs 41 through the slot-housed portions 21. This moves the slot-housed portions 21 (or the coils 20) and the first opening jigs 41 together to the radially outer side. The pressers 73 are structured to press the coil end portions 22 repeatedly in an intermittent manner.

Structure of First Guide

Figure 15:
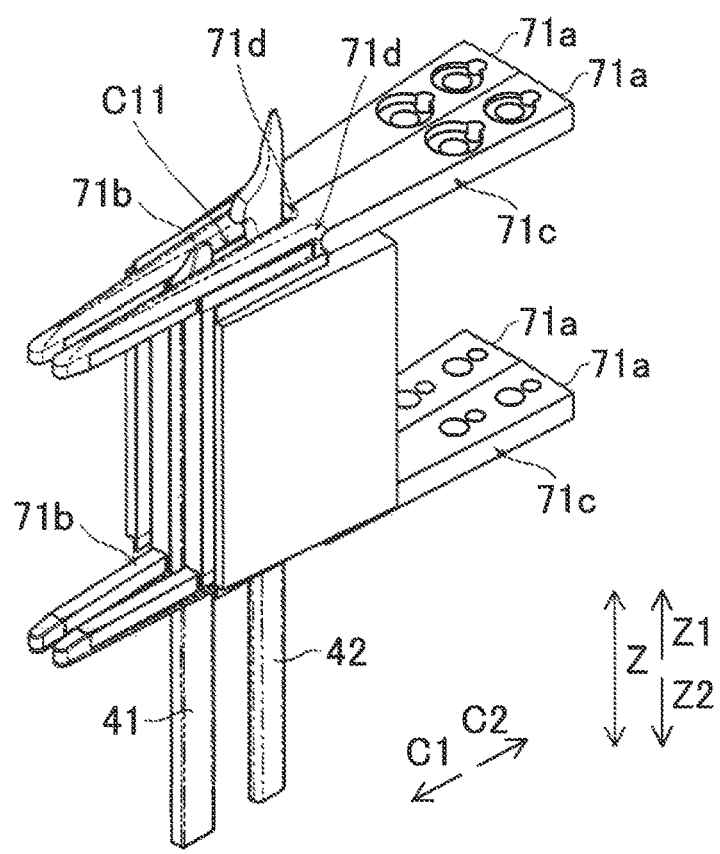
FIG. 15 is a perspective view illustrating structures of guide members according to one embodiment.
Figure 16:
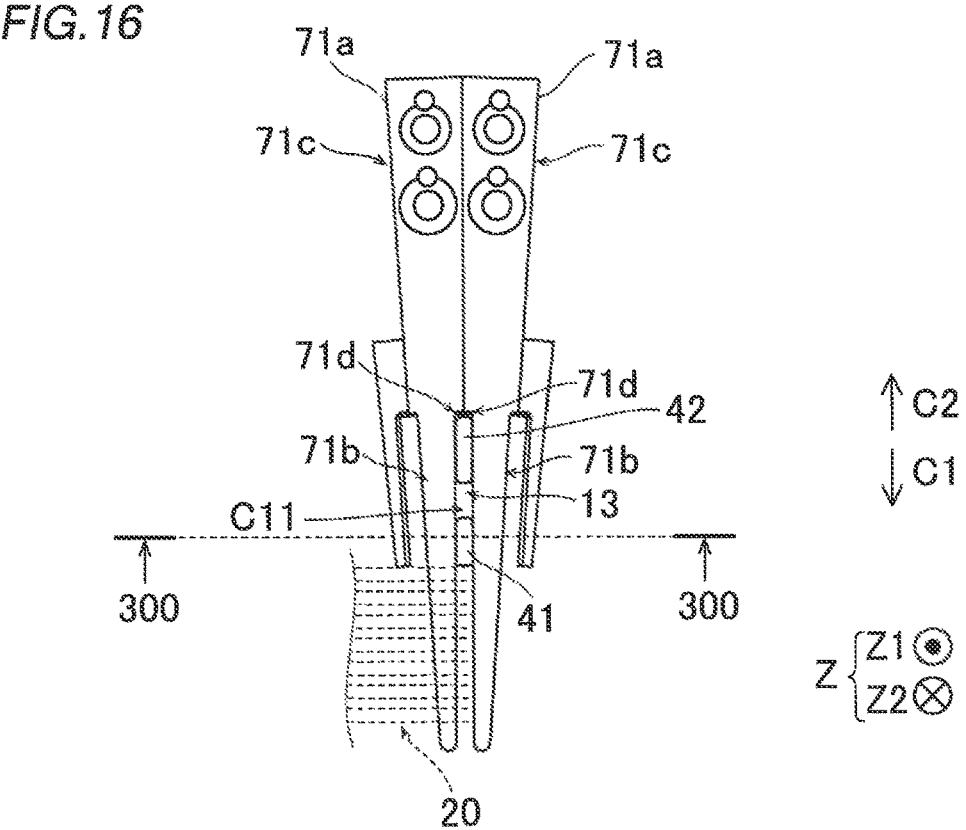
FIG. 16 is a plan view illustrating structures of the guide members according to one embodiment.

As illustrated in FIGS. 15 and 16, the first guide 71 includes a plurality of the guide members 71*a* (e.g., 96 guide members 71*a*) constituting the first guide 71. The first and second opening jigs 41 and 42 are disposed between each pair of guide members 71*a* adjacent to each other in the circumferential direction. Specifically, each of the guide members 71*a* includes: a radially inner side portion 71*b* provided on the radially inner side; and a radially outer side portion 71*c* provided on the radially outer side. The first guide 71 is structured such that the radially inner side portions 71*b* are arranged in the circumferential direction. Each of the guide members 71*a* includes smooth steps 71*d* provided between the radially inner side portion 71*b* and the radially outer side portion 71*c*. The steps 71*d* are provided on both sides of each guide member 71*a* in the circumferential direction. Thus, when each pair of guide members 71*a* is disposed such that the guide members 71*a* are adjacent to each other in the circumferential direction, a gap C11 is created between the radially inner side portions 71*b* adjacent to each other. The first and second opening jigs 41 and 42 are disposed in the gap C11. As illustrated in FIG. 16, the gaps C11 are created such that each gap C11 overlaps with the associated slot 13 as viewed in the central axis direction. As illustrated in FIGS. 15 and 16, only some of the guide members 71*a* (i.e., two of the guide members 71*a*) are illustrated for the sake of simplification. Each radially inner side portion 71*b* is an example of a "guide portion" in the claims.

In the present embodiment, the guide members 71*a* are provided such that each guide member 71*a* extends along the associated slot 13 and reaches the radially inner side of the associated slot 13 as viewed in the axial direction. In other words, the gaps C11 are created such that each gap C11 extends to the radially inner side of the associated slot 13. The circumferential width of each gap C11 (i.e., a width W2 that will be described below) is constant in the radial direction.

Figure 17:
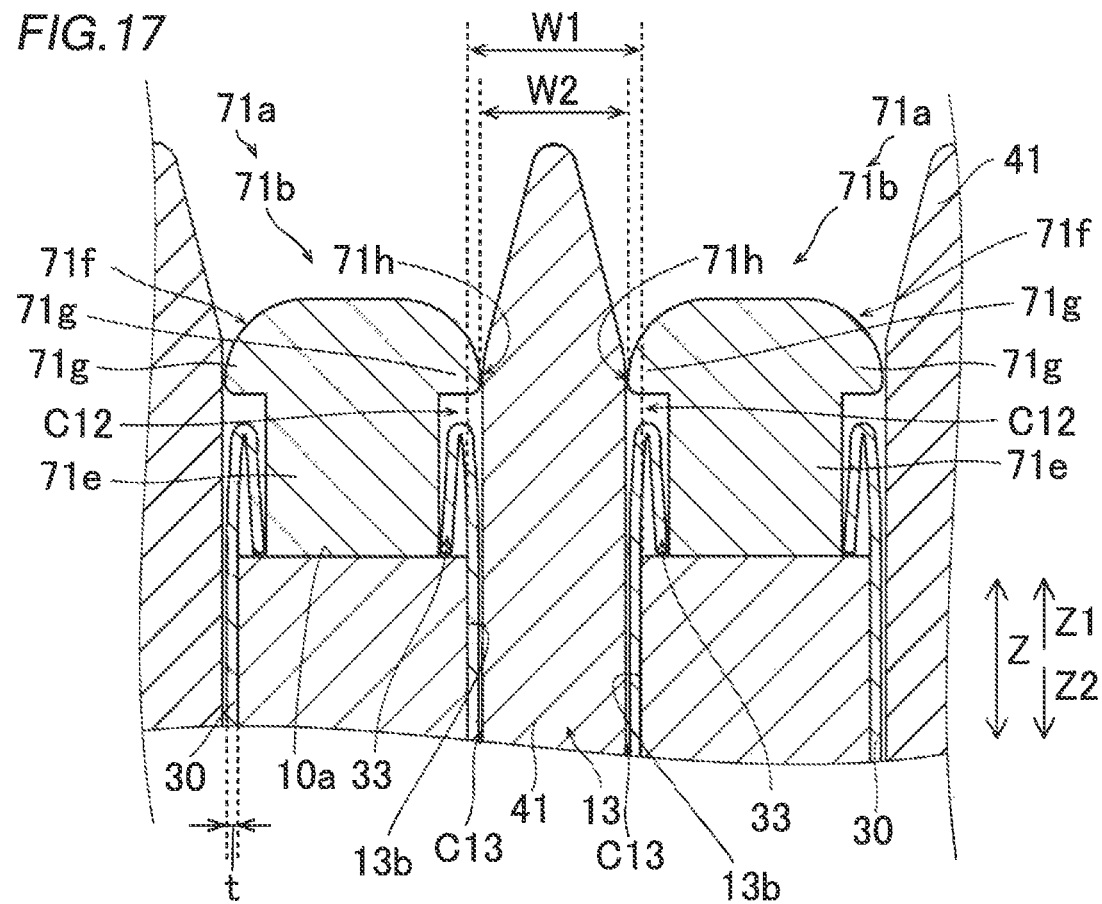
FIG. 17 is a partially enlarged cross-sectional view taken along the line 300-300 in FIG. 16.

As illustrated in FIG. 17, the first guide 71 (including the guide members 71*a*) is structured such that an end 71*h* of a first one of the guide members 71*a* (or a first one of the radially inner side portions 71*b*), facing a first one of the slots 13, is disposed on a second circumferential side (i.e., on the right side in FIG. 17 or the inner side of the first one of the slots 13) relative to the inner wall surface 13*b* of the first one of the slots 13 located on a first circumferential side (i.e., on the left side in FIG. 17). Accordingly, the first one of the radially inner side portions 71*b* is disposed to overlap with the inner wall surface 13*b* of the first one of the slots 13 located on the first circumferential side as viewed in the axial direction.

The first guide 71 (including the guide members 71*a*) is structured such that an end 71*h* (which faces the first one of the slots 13) of a second one of the guide members 71*a* (or a second one of the radially inner side portions 71*b*) adjacent to the first one of the guide members 71*a* (or the first one of the radially inner side portions 71*b*) is disposed on the first circumferential side (i.e., on the left side in FIG. 17 or the inner side of the first one of the slots 13) relative to the inner wall surface 13*b* of the first one of the slots 13 located on the second circumferential side (i.e., on the right side in FIG. 17). Accordingly, the second one of the radially inner side portions 71*b* is disposed to overlap with the inner wall surface 13*b* of the first one of the slots 13 located on the second circumferential side as viewed in the axial direction.

Thus, the guide members 71*a* (or the radially inner side portions 71*b*), which are provided adjacent to each other so as to sandwich the first one of the slots 13 therebetween, are disposed such that the ends 71*h* facing the slot 13 protrude to the inside of the slot 13 relative to the inner wall surfaces 13*b*.

At least at the location of the opening 13*a* of the slot 13, the end 71*h* of the first one of the guide members 71*a*, facing the first one of the slots 13, is disposed on the second circumferential side (i.e., on the right side in FIG. 17 or the inner side of the first one of the slots 13) relative to the inner wall surface 13b of the first one of the slots 13 located on the first circumferential side (i.e., on the left side in FIG. 17), and the end 71h (which faces the first one of the slots 13) of the second one of the guide members 71a adjacent to the first one of the guide members 71a is disposed on the first circumferential side (i.e., on the left side in FIG. 17 or the inner side of the first one of the slots 13) relative to the inner wall surface 13b of the first one of the slots 13 located on the second circumferential side (i.e., on the right side in FIG. 17). In the present embodiment, the ends 71h and the inner wall surfaces 13b have the above-described positional relationship throughout each associated slot 13 (i.e., at each location in the radial direction). The ends 71h and the inner wall surfaces 13b, however, do not necessarily have to have the above-described positional relationship at locations other than the opening 13a.

The first guide 71 is structured such that each circumferential gap C11 between adjacent ones of the guide members 71a (or the radially inner side portions 71b) corresponds to the width W2 smaller than the circumferential width W1 of each slot 13. In other words, the guide members 71a (or the radially inner side portions 71b) are structured to guide the associated first opening jig 41 through the width W2 smaller than the circumferential width W1 of each slot 13. Specifically, the radially inner side portion 71b of each guide member 71a includes: a leg 71e provided on the end face 10a of the stator core 10; and a head 71f provided on the leg 71e. The head 71f is provided on the first axial side of the leg 71e (i.e., in the direction of the arrow Z1). The head 71f is provided with overhangs 71g protruding from the leg 71e on both sides in the circumferential direction as viewed in the axial direction. The width W2 means an interval between the ends 71h disposed on the overhangs 71g provided on both sides of each first opening jig 41 in the circumferential direction. Each first opening jig 41 is guided by the ends 71h of the associated overhangs 71g on both sides in the circumferential direction. The guide members 71a on the end face 10b of the stator core 10 are similar in structure to the guide members 71a on the end face 10a and will thus not be described in detail. The width W2 is an example of a "second width" in the claims.

The collar-shaped portions 33 of the insulating sheets 30 are provided in gaps C12 surrounded by the overhangs 71g of the guide members 71a, the end face 10a of the stator core 10, the legs 71e of the guide members 71a, and the first opening jigs 41.

In the present embodiment, the first guide 71 (including the guide members 71a) is structured such that the width W2 is equal to or smaller than a difference between the width W1 of each slot 13 and a value twice as large as a thickness t of each insulating sheet 30 (i.e., such that W2≤W1−t×2). Specifically, the width W2 is smaller than the difference (i.e., W2<W1−t×2). Thus, a gap C13 is created between each first opening jig 41 and the associated insulating sheet 30 in each slot 13. The circumferential width (to which no reference sign is assigned) of the gap C13 is one-half of a differential between the difference and the width W2. For example, the differential between the difference and the width W2 is smaller than the thickness t of each insulating sheet 30.

In other words, the ends 71h of the guide members 71a (or the radially inner side portions 71b) are disposed closer to the associated first opening jig 41 (i.e., closer to the circumferential center of the associated slot 13) than the associated insulating sheet 30 on both sides of the associated first opening jig 41 in the circumferential direction. Thus, with each first opening jig 41 disposed in the associated slot 13, a distance (to which no reference sign is assigned) between each of the ends 71h of the guide members 71a (or the radially inner side portions 71b) and the associated first opening jig 41 is smaller than a distance (to which no reference sign is assigned) between each insulating sheet 30 and the associated first opening jig 41.

The guide members 71a (or the radially inner side portions 71b) are structured such that the width W2 is smaller than the difference (W1−t×2), which means that W2<W1−t×2, and is larger than the circumferential width W11 (see FIG. 8) of each first opening jig 41, which means that W2>W11. Thus, the gap C13 is created between each first opening jig 41 and the associated insulating sheet 30 in each slot 13, and a gap C14 (see FIG. 18) is created between the end 71h of each guide member 71a (or each radially inner side portion 71b) and the associated first opening jig 41 or a lateral surface 41h thereof, which will be described below (see FIG. 18).

Figure 18:
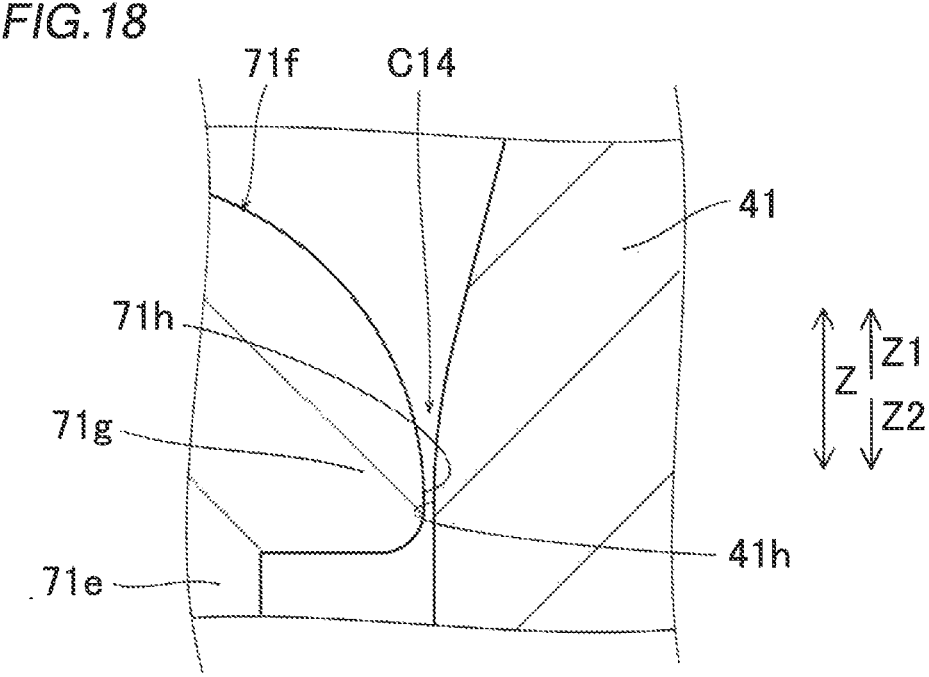
FIG. 18 is a partially enlarged view of the vicinity of an end of the guide member (radially inner side portion) in FIG. 17.

As illustrated in FIG. 18, the ends 71h of the guide members 71a (or the radially inner side portions 71b) each have a flat shape extending along the axial direction. In the present embodiment, the ends 71h each having a flat shape are provided such that each end 71h guides the lateral surface 41h of the associated first opening jig 41 having a flat shape extending along the axial direction. In other words, each end 71h extends in the axial direction along the lateral surface 41h of the associated first opening jig 41. The ends 71h and the lateral surfaces 41h, each having a flat shape, are provided such that each end 71h and the associated lateral surface 41h face each other in the circumferential direction.

Stator Assembling Method

Referring to FIG. 1, FIG. 2, FIGS. 5 to 8, FIG. 10, and FIGS. 12 to 21, a method for assembling the stator 100 will be described below. In the present embodiment, the following description discusses a method for assembling the stator 100 (see FIG. 1) including: the stator core 10 including the slots 13 with the openings 13a open to the radially inner side; the coils 20 including the slot-housed portions 21 each housed in an associated one of the slots 13; and the insulating sheets 30 each disposed between an associated one of the slots 13 and an associated one of the slot-housed portions 21.

Step of Disposing Insulating Sheets in Slots

Figure 19:
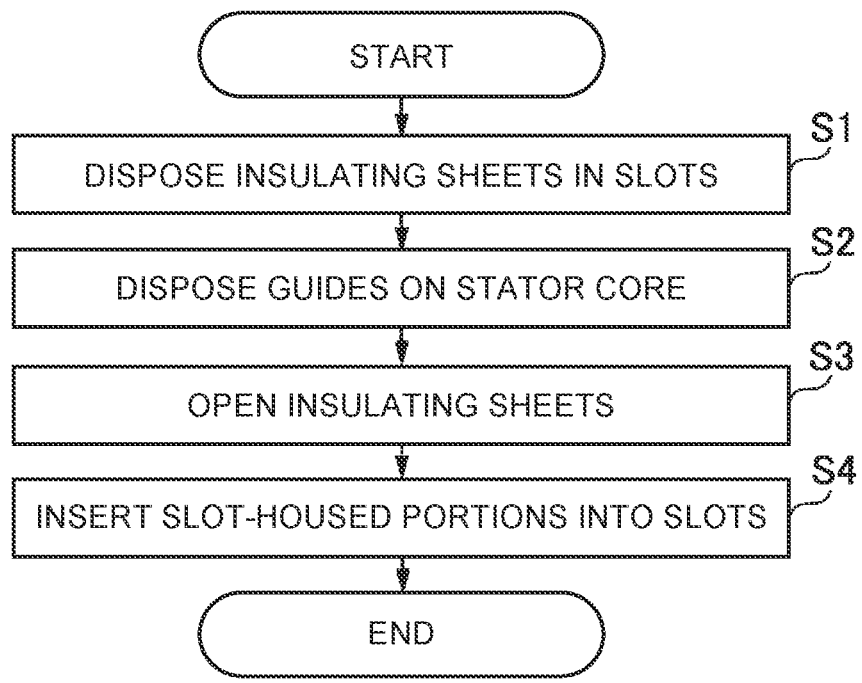
FIG. 19 is a flow chart for describing a stator assembling method according to one embodiment.
Figure 20:
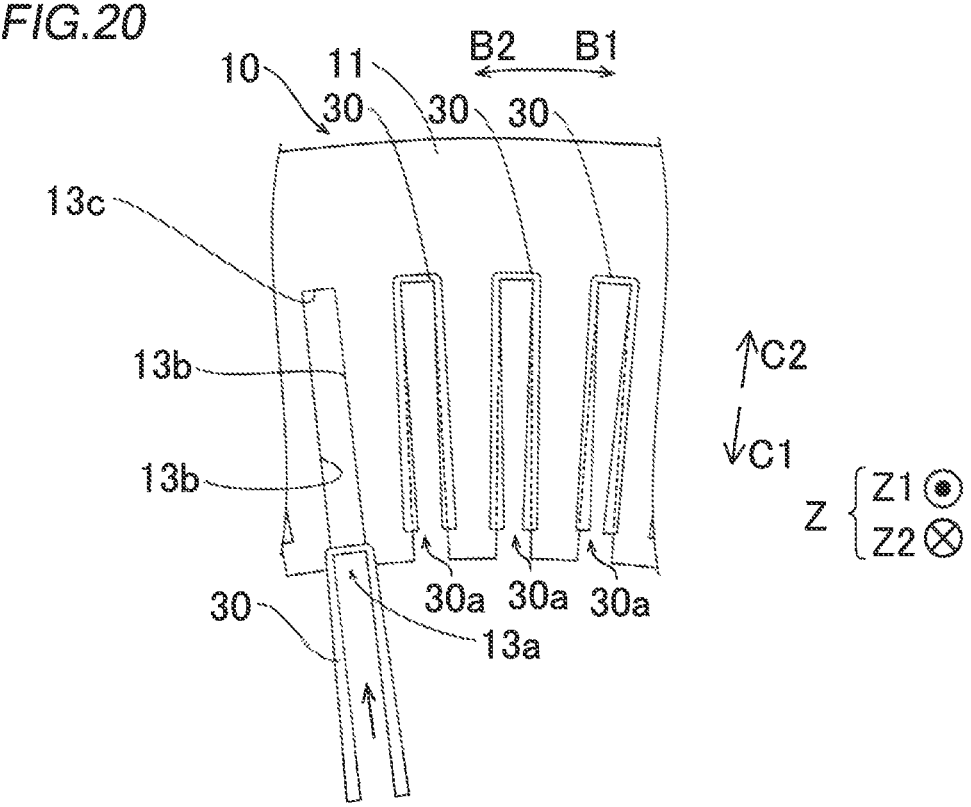
FIG. 20 is a diagram for describing a method for disposing the insulating sheets according to one embodiment in the slots.

First, as illustrated in FIG. 19, step S1 involves disposing each insulating sheet 30 in an associated one of the slots 13. Specifically, as illustrated in FIG. 20, the insulating sheets 30 are disposed radially inward of the stator core 10, and the insulating sheets 30 are moved radially outward, so that the insulating sheets 30 are disposed in the slots 13. Before the step of opening the insulating sheets 30, the radial openings 30a of the insulating sheets 30 are closed to a greater degree than when the radial openings 30a are in a completely opened state (i.e., a state where the first opening jigs 41 are disposed inside the insulating sheets 30).

Step of Disposing Guides

Then, as illustrated in FIG. 19, step S2 involves disposing the guides (71, 72) on the stator core 10. Specifically, as illustrated in FIG. 12, the first guide 71 (including the guide members 71a) is disposed such that the end 71h of the first one of the guide members 71a (or the first one of the radially inner side portions 71b), facing the first one of the slots 13, is disposed on the second circumferential side (i.e., on the right side in FIG. 17 or the inner side of the first one of the slots 13) relative to the inner wall surface 13*b* of the first one of the slots 13 located on the first circumferential side (i.e., on the left side in FIG. 17).

The first guide 71 (including the guide members 71*a*) is disposed such that the end 71*h* (which faces the first one of the slots 13) of the second one of the guide members 71*a* (or the second one of the radially inner side portions 71*b*) adjacent to the first one of the guide members 71*a* (or the first one of the radially inner side portions 71*b*) is disposed on the first circumferential side (i.e., on the left side in FIG. 17 or the inner side of the first one of the slots 13) relative to the inner wall surface 13*b* of the first one of the slots 13 located on the second circumferential side (i.e., on the right side in FIG. 17). Specifically, in this step, the first guide 71 is disposed such that the first one of the radially inner side portions 71*b* overlaps with the inner wall surface 13*b* of the first one of the slots 13 on the first circumferential side as viewed in the axial direction, and the second one of the radially inner side portions 71*b* overlaps with the inner wall surface 13*b* of the first one of the slots 13 on the second circumferential side as viewed in the axial direction. The first guide 71 is disposed such that the first guide 71 is adjacent to the stator core 10 on both sides in the axial direction of the stator core 10.

At least at the location of the opening 13*a* of the slot 13, the end 71*h* of the first one of the guide members 71*a*, facing the first one of the slots 13, is disposed on the second circumferential side (i.e., on the right side in FIG. 17 or the inner side of the first one of the slots 13) relative to the inner wall surface 13*b* of the first one of the slots 13 located on the first circumferential side (i.e., on the left side in FIG. 17), and the end 71*h* (which faces the first one of the slots 13) of the second one of the guide members 71*a* adjacent to the first one of the guide members 71*a* is disposed on the first circumferential side (i.e., on the left side in FIG. 17 or the inner side of the first one of the slots 13) relative to the inner wall surface 13*b* of the first one of the slots 13 located on the second circumferential side (i.e., on the right side in FIG. 17). In the present embodiment, the guide members 71*a* are disposed such that the ends 71*h* and the inner wall surfaces 13*b* have the above-described positional relationship throughout each associated slot 13 (i.e., at each location in the radial direction).

The first guide 71 (including the guide members 71*a*) is disposed on both sides in the axial direction of the stator core 10 such that each circumferential gap C11 (see FIG. 16) between adjacent ones of the guide members 71*a* (or the radially inner side portions 71*b*) corresponds to the width W2 (see FIG. 17) smaller than the width W1 (see FIG. 17) of each slot 13. The second guide 72 is disposed radially inward of the teeth 12 of the stator core 10. The coil assembly 20*a* including the coils 20 and having an annular shape is disposed radially inward of the stator core 10.

In the present embodiment, the step (step S2) of disposing the first guide 71 (including the guide members 71*a*) involves disposing the first guide 71 (including the guide members 71*a*) such that the width W2 (see FIG. 17) is equal to or smaller than a difference between the width W1 (see FIG. 17) of each slot 13 and a value twice as large as the thickness t (see FIG. 17) of each insulating sheet 30 (i.e., such that W2≤W1−t×2). Specifically, the step of disposing the first guide 71 (including the guide members 71*a*) involves disposing the first guide 71 (including the guide members 71*a*) such that the width W2 is smaller than the difference (i.e., such that W2<W1−t×2). Thus, this step involves creating the gap C13 between each first opening jig 41 and the associated insulating sheet 30 in each slot 13.

In other words, the step (step S2) of disposing the first guide 71 (including the guide members 71*a*) involves disposing the first guide 71 (including the guide members 71*a*) such that the ends 71*h* of the guide members 71*a* (or the radially inner side portions 71*b*) are disposed closer to the associated first opening jig 41 (i.e., closer to the circumferential center of the associated slot 13) than the associated insulating sheet 30 on both sides of the associated first opening jig 41 in the circumferential direction. Thus, this step involves disposing the guide members 71*a* such that, with each first opening jig 41 disposed in the associated slot 13, a distance (to which no reference sign is assigned) between each of the ends 71*h* of the guide members 71*a* (or the radially inner side portion 71*bs*) and the associated first opening jig 41 is smaller than a distance (to which no reference sign is assigned) between each insulating sheet 30 and the associated first opening jig 41.

The step (step S2) of disposing the first guide 71 (including the guide members 71*a*) involves disposing the first guide 71 (including the guide members 71*a*) such that the width W2 (see FIG. 17) is smaller than the difference (W1−t×2) and larger than the circumferential width W11 (see FIG. 8) of each first opening jig 41. Thus, this step involves disposing the guide members 71*a* such that, with each first opening jig 41 disposed in the associated slot 13, the gap C14 (see FIG. 18) is created between each of the ends 71*h* and the associated first opening jig 41 or the lateral surface 41*h* thereof (see FIG. 18), while the gap C13 is created between each first opening jig 41 and the associated insulating sheet 30 in each slot 13. At the time of performing step S2, the first opening jigs 41 are yet to be disposed in the slots 13.

The step (step S2) of disposing the first guide 71 (including the guide members 71*a*) involves moving each of the guide members 71*a* from the radially outer side toward the center of the stator core 10 so as to arrange the guide members 71*a* circumferentially such that the guide members 71*a* are adjacent to each other in the circumferential direction. Accordingly, the first guide 71 has an annular shape.

Step of Opening Insulating Sheets

As illustrated in FIG. 19, after the step of disposing the insulating sheets 30 in the slots 13, step S3 involves inserting the first opening jigs 41 into the slots 13 such that the insulating sheets 30 are each disposed between the inner wall surfaces (13*b*, 13*c*) of the associated slot 13 and the associated first opening jig 41. Specifically, the first opening jigs 41 are inserted inside the insulating sheets 30 along the axial direction. This opens the radial openings 30*a* of the insulating sheets 30. More specifically, as illustrated in FIG. 13, the insulating member opener 40 (see FIG. 5) is disposed on the first axial side of the stator core 10 (i.e., in the direction of the arrow Z2), the insulating member opener 40 is moved in the direction of the arrow Z1, and the first opening jigs 41 and the second opening jigs 42 are inserted into the circumferentially inner regions of the insulating sheets 30 in the slots 13 in the axial direction, so that the radial openings 30*a* of the insulating sheets 30 on the radially inner side are opened.

As illustrated in FIG. 8, the present embodiment involves opening a portion of each insulating sheet 30 corresponding to the insertion position of the associated first opening jig 41 (i.e., a portion of each insulating sheet 30 adjacent to the radial position P1) in a state where each second opening jig 42 whose radial position is fixed is inserted into the associated slot 13 along the axial direction at the radial position P3 radially outward of each first opening jig 41. Specifically, in a state where each first portion 43, which is a portion of each second opening jig 42 located on the radially outer side, is inserted into the associated slot 13, a portion of each insulating sheet 30 adjacent to the radial position P2 is opened. In a state where each second portion 44 located on the radially inner side is inserted into the associated slot 13 after the start of insertion of each first portion 43, a portion of each insulating sheet 30 adjacent to the radial position P1 is opened. In a state where each first opening jig 41 is inserted into the associated slot 13 after the start of insertion of each second portion 44, the radial opening 30a of each insulating sheet 30 is opened.

More specifically, each insulating sheet 30 is opened sequentially from the radially outer side to the radially inner side (i.e., from the radial position P3 to the radial positions P2 and P1). The insulating member opener 40 (see FIG. 5) is disposed on a portion of the stator core 10 located in the direction of the arrow Z2 in a state where the radially inner side end 41b of each first opening jig 41 is disposed at substantially the same radial position as the radially inner side end 30c of the associated insulating sheet 30 or disposed at the radial position P1 radially inward of the end 30c, the tip 43a of the first portion 43 of each second opening jig 42 is disposed at the radial position P3 radially outward of the radial position P1, and the end 44a of the second portion 44 of each second opening jig 42 is disposed radially inward of the radial position P3.

Moving the base 50 in the direction of the arrow Z1 moves the first opening jigs 41 and the second opening jigs 42 together in the direction of the arrow Z1. The tip 43a of each second opening jig 42 having the protrusion height H2 enters the inside of the associated insulating sheet 30 at the radial position P3. This causes a portion of each insulating sheet 30 adjacent to the radial position P3 to open in the circumferential direction. At this point, the back wall 32 of each insulating sheet 30 is disposed at a position between the end 42a of the associated second opening jig 42 and the inner wall surface 13c of the associated slot 13, thus effecting positioning of each insulating sheet 30 in the radial direction.

The end 44a of each second opening jig 42 having the protrusion height H3 enters the inside of the associated insulating sheet 30 at the radial position P2. This causes a portion of each insulating sheet 30 adjacent to the radial position P2 to open in the circumferential direction.

The tip 41a of each first opening jig 41 having the protrusion height H1 enters the inside of the associated insulating sheet 30 at the radial position P1. This causes a portion of each insulating sheet 30 adjacent to the radial position P1 to open in the circumferential direction. Because the radial position P1 is located radially inward of the radial opening 30a of each insulating sheet 30, inserting the first opening jigs 41 into the slots 13 opens the radial openings 30a.

In the present embodiment, as illustrated in FIG. 13, the step (step S3) of opening the radial openings 30a of the insulating sheets 30 on the radially inner side involves inserting the first opening jigs 41 into the slots 13 (i.e., into the inside of the insulating sheets 30) while guiding the first opening jigs 41 by the first guide 71 (i.e., the guide members 71a) disposed on the end face 10b of the stator core 10 through which the first opening jigs 41 are to be inserted (i.e., which is located in the direction of the arrow Z2) such that movement of the first opening jigs 41 in the circumferential direction is restricted, thus opening the radial openings 30a of the insulating sheets 30. Specifically, when the first opening jigs 41 are inserted into the slots 13 (i.e., into the inside of the insulating sheets 30), the first opening jigs 41 are moved in the axial direction while their movement in the circumferential direction is restricted by the guide members 71a on the end face 10b or the ends 71h (see FIG. 18). When the first opening jigs 41 are inserted into the slots 13 (i.e., into the inside of the insulating sheets 30), the second opening jigs 42 are also inserted into the slots 13 (i.e., into the inside of the insulating sheets 30) while being guided by the guide members 71a disposed on the end face 10b of the stator core 10.

When the first opening jigs 41 are moved in the axial direction, each first opening jig 41 is moved to an axial position where each of the lateral surfaces 41h (see FIG. 18) of the first opening jigs 41 faces, in the circumferential direction, the end 71h (see FIG. 18) of the associated guide member 71a located on the end face 10a of the stator core 10.

Step of Inserting Slot-Housed Portions into Slots

As illustrated in FIG. 19, step S4 involves, after the step of opening the insulating sheets 30, moving the coils 20 and the first opening jigs 41 together to the radially outer side relative to the stator core 10, with the slot-housed portions 21 in contact with the first opening jigs 41, thus inserting the slot-housed portions 21 into the slots 13 through the openings 13a.

As illustrated in FIGS. 6 and 10, the coils 20 and the first opening jigs 41 are moved together to the radially outer side relative to the stator core 10 such that the distance D1 between each first opening jig 41 and the associated second opening jig 42 in the radial direction decreases to a distance D2. The slot-housed portions 21 are thus inserted into the slots 13 through the openings 13a.

As illustrated in FIG. 14, with the first opening jigs 41 urged to the radially inner side by the urgers 60, the slot-housed portions 21 are pressed against the first opening jigs 41 toward the radially outer side by the pressers 73, so that the coils 20 and the first opening jigs 41 are moved together to the radially outer side relative to the stator core 10 against the urging force F1.

Specifically, the first pressers 73a are disposed radially inward of the coil end portions 22 located on the first axial side (i.e., located in the direction of the arrow Z1), and the second pressers 73b are disposed radially inward of the coil end portions 22 located on the second axial side (i.e., located in the direction of the arrow Z2). Moving the first pressers 73a and 73b to the radially outer side presses the coil end portions 22 to the radially outer side. The slot-housed portions 21 continuous with the coil end portions 22 abut against the first opening jigs 41 and press the first opening jigs 41 to the radially outer side.

At this point, the slot-housed portions 21 press the first opening jigs 41 with the pressing force F2 greater than the urging force F1. The slot-housed portions 21 and the first opening jigs 41 thus move together to the radially outer side. Because the radial positions of the second opening jigs 42 are fixed, the distance between each first opening jig 41 and the associated second opening jig 42 decreases from the distance D1 (see FIG. 6) to the distance D2 (see FIG. 10).

As illustrated in FIG. 17, the present embodiment involves moving the coils 20 and the first opening jigs 41 together to the radially outer side relative to the stator core 10 while guiding the first opening jigs 41 by the first guide 71 (i.e., the guide members 71a) such that movement of the first opening jigs 41 in the circumferential direction is restricted, thus inserting the slot-housed portions 21 into the slots 13 through the openings 13a. In other words, the first opening jigs 41 are moved to the radially outer side, with movement of each first opening jig 41 in the circumferential direction and inclination of each first opening jig 41 relative to the axial direction being restricted by the ends 71h on both sides in the circumferential direction.

The step of inserting the slot-housed portions 21 into the slots 13 involves moving the coils 20 and the first opening jigs 41 together to the radially outer side relative to the stator core 10 while guiding the first opening jigs 41 such that movement of the first opening jigs 41 in the circumferential direction is restricted by the first guide 71 (i.e., the guide members 71a) located on both sides in the axial direction, thus inserting the slot-housed portions 21 into the slots 13 through the openings 13a. In other words, the first opening jigs 41 are moved to the radially outer side, with movement of each first opening jig 41 in the circumferential direction and inclination of each first opening jig 41 relative to the axial direction being restricted by the ends 71h on both sides in the axial direction.

The step of inserting the slot-housed portions 21 into the slots 13 involves moving the coils 20 and the first opening jigs 41 together to the radially outer side relative to the stator core 10 while guiding the first opening jigs 41 such that movement of the first opening jigs 41 in the circumferential direction is restricted by the first guide 71 (i.e., the guide members 71a) and guiding the coils 20 such that movement of the coils 20 in the circumferential direction is restricted by the first guide 71 (i.e., the guide members 71a), thus inserting the slot-housed portions 21 into the slots 13 through the openings 13a. In other words, not only the first opening jigs 41 but also the coils 20 are moved to the radially outer side, with movement of each first opening jig 41 and each coil 20 in the circumferential direction and inclination of each first opening jig 41 and each coil 20 relative to the axial direction being restricted by the ends 71h on both sides in the circumferential direction.

As illustrated in FIG. 16, the coils 20 (or at least portions of the coils 20) are disposed radially inward of the slots 13 before the start of movement of the coils 20 and the first opening jigs 41 to the radially outer side. Accordingly, until the coils 20 are inserted into the slots 13, portions of the coils 20 disposed radially inward of the slots 13 are moved to the radially outer side while being guided by portions of the guide members 71a extending to the radially inner side of the slots 13.

In the present embodiment, as illustrated in FIG. 18, the step of inserting the slot-housed portions 21 into the slots 13 involves guiding the lateral surfaces 41h of the first opening jigs 41, each having a flat shape extending along the axial direction, by the ends 71h of the guide members 71a (or the radially inner side portions 71b), each having a flat shape extending along the axial direction, thus inserting the slot-housed portions 21 into the slots 13 while guiding the first opening jigs 41 by the ends 71h in the circumferential direction. In other words, the first opening jigs 41 are moved to the radially outer side along the ends 71h, with the flat-shaped ends 71h and the flat-shaped lateral surfaces 41h of the first opening jigs 41 facing each other in the circumferential direction.

The following description discusses a comparative example where the width W2 is relatively large (e.g., where the width W2 is equal to or larger than the width W1). In this case, the first guide 71 insufficiently restricts the first opening jigs 41 in the circumferential direction. Thus, when the coils 20 are pressed and inserted into the slots 13 from the radially inner side, the coils 20 may incline to either one of the sides in the circumferential direction. When the coils 20 are wound coils, the coils may deviate to one side in the circumferential direction by being pressed and deformed into a barrel-like shape. When the coils 20 are wave-wound coils, the coils may also deviate to one side in the circumferential direction by being pressed and deformed into an S shape. In such cases, the first opening jigs 41 in abutment with the coils on the radially outermost side may also deviate (or incline) to one side in the circumferential direction together with the coils. In this state, movement of the first opening jigs 41 to the radially outer side causes the first opening jigs 41 to rub against the insulating sheets 30, resulting in damage to the insulating sheets 30.

Figure 21:
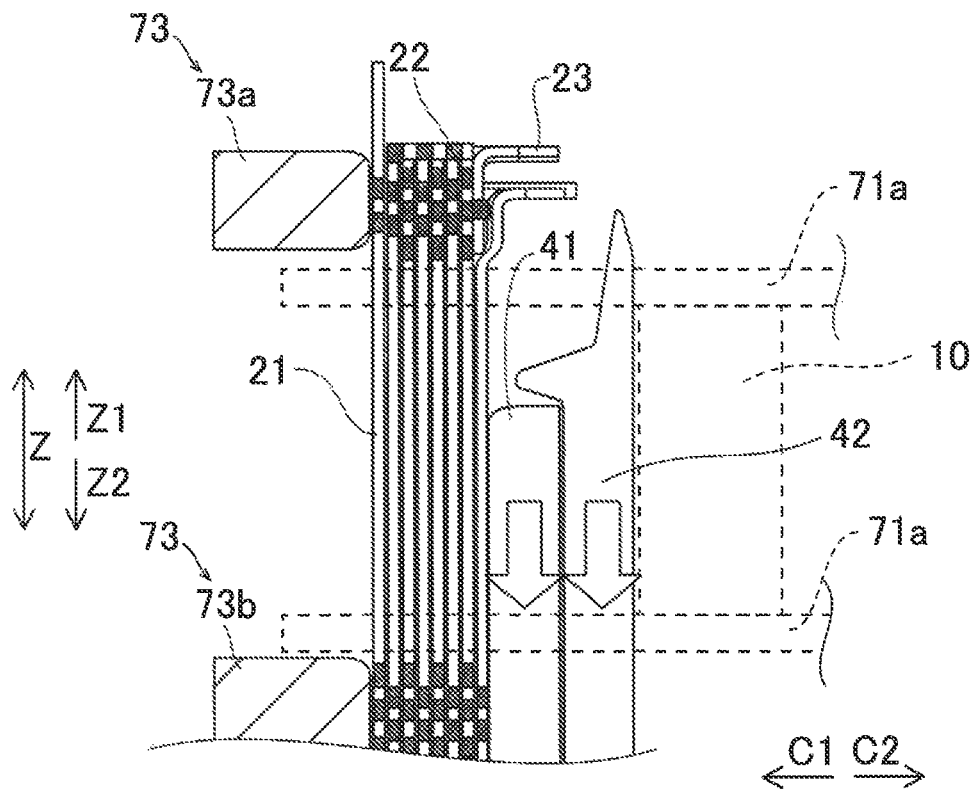
FIG. 21 is a diagram for describing a method for removing the first opening jigs and the second opening jigs according to one embodiment from the slots.

As illustrated in FIG. 21, after the movement of the slot-housed portions 21 and the first opening jigs 41, the first opening jigs 41 and the second opening jigs 42 are moved together in the direction of the arrow Z2, so that the first opening jigs 41 and the second opening jigs 42 are withdrawn in the direction of the arrow Z2 relative to the slots 13. In this state, the coils 20 are moved to the radially outer side. Thus, the slot-housed portions 21 are disposed in the slots 13 as illustrated in FIG. 2. When the first opening jigs 41 and the second opening jigs 42 are moved in the direction of the arrow Z2, the first opening jigs 41 and the second opening jigs 42 are withdrawn (or moved) in the direction of the arrow Z2 while being guided by the first guide 71 (i.e., the guide members 71a) on the end face 10b of the stator core 10, so that the first opening jigs 41 and the second opening jigs 42 are pulled out of the slots 13. Consequently, the assembly of the stator 100 is finished as illustrated in FIG. 1.

Effects of Present Embodiment

The present embodiment is able to achieve effects described below.

Effects of Stator Assembling Method

In the present embodiment, a method for assembling a stator (100) includes, as described above, the step of disposing a guide (71) to restrict movement of opening jigs (41) in a circumferential direction, such that the guide (71) is adjacent to a stator core (10) in an axial direction of the stator core (10). The method for assembling the stator (100) includes, after the step of disposing insulating members (30), the step of inserting the opening jigs (41) into slots (13) such that each insulating member (30) is disposed between an inner wall surface (13b) of the associated slot (13) and the associated opening jig (41), thus opening a portion (30a) of each insulating member (30) on a first side in a radial direction. The method for assembling the stator (100) includes, after the step of opening the insulating members (30), the step of moving coils (20) and the opening jigs (41) together to a second side in the radial direction relative to the stator core (10) while guiding the opening jigs (41) such that movement of the opening jigs (41) in the circumferential direction is restricted by the guide (71), thus inserting slot-housed portions (21) into the slots (13) through openings (13a). This makes it possible to prevent the opening jigs (41) from coming into contact with the insulating members (30) disposed in the slots (13), because movement of the opening jigs (41) in the circumferential direction is restricted by the guide (71). Accordingly, the present embodiment is able to prevent the insulating members (30) from being broken by the opening jigs (41) and prevent the insulating members (30) from being jammed between the opening jigs (41) and teeth (12). Consequently, the present embodiment is able to prevent occurrence of an insulation failure of the stator (100) resulting from breakage and jamming of the insulating members (30).

In the present embodiment, the step of disposing the guide (71) involves, as described above, disposing the guide (71) such that guide portions (71b) included in the guide (71) are arranged in the circumferential direction. The step of disposing the guide (71) involves disposing the guide (71) such that a first one of the guide portions (71b) overlaps with the inner wall surface (13b) of a first one of the slots (13) on a first side in the circumferential direction as viewed in the axial direction, and such that a second one of the guide portions (71b) adjacent to the first one of the guide portions (71b) in the circumferential direction overlaps with the inner wall surface (13b) of the first one of the slots (13) on a second side in the circumferential direction as viewed in the axial direction. Such an embodiment facilitates contact of the opening jigs (41) with the guide portions (71b) adjacent to each other in the circumferential direction, making it possible to more reliably prevent the opening jigs (41) from coming into contact with the insulating members (30).

In the present embodiment, the step of disposing the guide (71) involves, as described above, disposing the guide (71) such that an end (71h) of the first one of the guide portions (71b), facing the first one of the slots (13), is disposed at a position corresponding in the circumferential direction to that of the inner wall surface (13b) of the first one of the slots (13) on the first side in the circumferential direction or disposed inward of the first one of the slots (13), thus causing the first one of the guide portions (71b) to overlap with the inner wall surface (13b) of the first one of the slots (13) on the first side in the circumferential direction as viewed in the axial direction, and such that an end (71h) of the second one of the guide portions (71b), facing the first one of the slots (13), is disposed at a position corresponding in the circumferential direction to that of the inner wall surface (13b) of the first one of the slots (13) on the second side in the circumferential direction or disposed inward of the first one of the slots (13), thus causing the second one of the guide portions (71b) to overlap with the inner wall surface (13b) of the first one of the slots (13) on the second side in the circumferential direction as viewed in the axial direction. Such an embodiment makes it possible to easily restrict movement of the opening jigs (41) in the circumferential direction by the ends (71h) of the guide portions (71b) adjacent to each other in the circumferential direction.

In the present embodiment, the step of disposing the guide (71) involves, as described above, disposing the guide (71) such that a gap (C11) between adjacent ones of the guide portions (71b) in the circumferential direction corresponds to a second width (W2) smaller than a first width (W1) that is a width of each slot (13) in the circumferential direction. Such an embodiment guides each opening jig (41) through the second width (W2) smaller than the first width (W1) of each slot (13), making it possible to prevent the opening jigs (41) from coming into contact with the insulating members (30) disposed in the slots (13).

In the present embodiment, the step of disposing the guide (71) involves, as described above, disposing the guide (71) such that the second width (W2) is equal to or smaller than a difference between the first width (W1) of each slot and a value twice as large as a thickness (t) of each insulating member (30). Such an embodiment is able to prevent the opening jigs (41) from coming into contact with the insulating members (30) (or prevent the insulating members (30) from being pressed by the opening jigs (41)) during movement of the opening jigs (41) to the second side in the radial direction more reliably than when the second width (W2), through which each opening jig (41) is to be guided, is larger than the difference between the first width (W1) of each slot (13) and the value twice as large as the thickness (t) of each insulating member (30).

In the present embodiment, the step of disposing the guide (71) involves, as described above, disposing the guide (71) such that the second width (W2) is smaller than the difference. Such an embodiment is able to prevent the opening jigs (41) from coming into contact with the insulating members (30) (or prevent the insulating members (30) from being pressed by the opening jigs (41)) with higher reliability during movement of the opening jigs (41) to the second side in the radial direction.

In the present embodiment, the step of disposing the guide (71) involves, as described above, disposing the guide (71) such that the ends (71h) of the guide portions (71b) are disposed closer to the opening jigs (41) than the insulating members (30) on both sides of the opening jigs (41) in the circumferential direction. Such an embodiment is able to prevent the opening jigs (41) from coming closer to the insulating members (30) than the ends (71h).

In the present embodiment, the step of inserting the slot-housed portions (21) into the slots (13) involves, as described above, guiding lateral surfaces (41h) of the opening jigs (41), each having a flat shape extending along the axial direction, by the ends (71h) of the guide portions (71b), each having a flat shape extending along the axial direction, thus inserting the slot-housed portions (21) into the slots (13) while guiding the opening jigs (41) such that movement of the opening jigs (41) in the circumferential direction is restricted by the ends (71h). Such an embodiment guides the flat-shaped lateral surfaces (41h) of the opening jigs (41) by the flat-shaped ends (71h), making it possible to guide the opening jigs (41) smoothly.

In the present embodiment, the step of disposing the guide (71) involves, as described above, disposing the guide (71) such that the second width (W2) is smaller than the difference and larger than a third width (W11) of each opening jig (41) in the circumferential direction. Such an embodiment makes it possible to move the opening jigs (41) to the second side in the radial direction smoothly while preventing, with the guide (71), the opening jigs (41) from coming into contact with the insulating members (30) (or preventing, with the guide (71), the insulating members (30) from being pressed by the opening jigs (41)) during movement of the opening jigs (41) to the second side in the radial direction.

In the present embodiment, the step of disposing the guide (71) involves, as described above, disposing the guide (71) such that the guide (71) is adjacent to the stator core (10) on both sides in the axial direction. The step of inserting the slot-housed portions (21) into the slots (13) involves moving the coils (20) and the opening jigs (41) together to the second side in the radial direction relative to the stator core (10) while guiding the opening jigs (41) such that movement of the opening jigs (41) in the circumferential direction is restricted by the guide (71) on both sides in the axial direction, thus inserting the slot-housed portions (21) into the slots (13) through the openings (13a). Such an embodiment makes it possible to prevent the opening jigs (41) from coming into contact with the insulating members (30) (or prevent the insulating members (30) from being pressed by the opening jigs (41)) during movement of the opening jigs (41) to the second side in the radial direction more reliably than when the guide (71) is disposed on only one side in the axial direction.

In the present embodiment, the step of disposing the guide (71) involves, as described above, disposing the guide (71) at least on a side of the stator core (10) from which the opening jigs (41) are to be inserted into the slots (13). The step of opening the portions (30*a*) of the insulating members (30) on the first side in the radial direction involves inserting the opening jigs (41) into the slots (13) while guiding the opening jigs (41) by the guide (71) disposed on the side of the stator core (10), from which the opening jigs (41) are to be inserted into the slots (13), such that movement of the opening jigs (41) in the circumferential direction is restricted, thus opening the portions (30*a*) of the insulating members (30) on the first side in the radial direction. When the opening jigs (41) are inserted into the slots (13) along the axial direction, such an embodiment makes it possible to reduce the amount of deviation of the position of each opening jig (41) in the circumferential direction and the amount of inclination of each opening jig (41) relative to the axial direction by the guide (71) disposed on the side of the stator core (10) from which the opening jigs (41) are to be inserted. Consequently, such an embodiment is able to prevent the opening jigs (41) from coming into contact with the insulating members (30) (or prevent the insulating members (30) from being pressed by the opening jigs (41)) during insertion of the opening jigs (41) into the slots (13).

In the present embodiment, the step of inserting the slot-housed portions (21) into the slots (13) involves, as described above, moving the coils (20) and the opening jigs (41) together to the second side in the radial direction relative to the stator core (10) while guiding the opening jigs (41) such that movement of the opening jigs (41) in the circumferential direction is restricted by the guide (71) and guiding the coils (20) such that movement of the coils (20) in the circumferential direction is restricted by the guide (71), thus inserting the slot-housed portions (21) into the slots (13) through the openings (13*a*). Such an embodiment makes it possible to move the coils (20) and the opening jigs (41) together to the second side in the radial direction while guiding the coils (20) by the guide (71) simultaneously with guiding the opening jigs (41) by the guide (71).

In the present embodiment, the insertion of the opening jigs (41) into the slots (13) involves, as described above, moving the opening jigs (41) along the axial direction, thus inserting the opening jigs (41) into the slots (13). Such an embodiment would enable insertion of the opening jigs (41) into the slots (13) without bringing the opening jigs (41) into contact with the insulating members (30) if the radial openings (30*a*) of the insulating members (30) disposed in the slots (13) are relatively closed.

In the present embodiment, the step of disposing the guide (71) involves, as described above, disposing the guide (71) such that at least at a location of the associated opening (13*a*), a first circumferential side end (71*h*) of the first one of the guide portions (71*b*) is disposed at a position corresponding in the circumferential direction to that of the inner wall surface (13*b*) of the first one of the slots (13) on the second side in the circumferential direction or disposed on the first side in the circumferential direction relative to the inner wall surface (13*b*) of the first one of the slots (13) on the second side in the circumferential direction, and a second circumferential side end (71*h*) of the second one of the guide portions (71*b*) adjacent to the first one of the guide portions (71*b*) is disposed at a position corresponding in the circumferential direction to that of the inner wall surface (13*b*) of the first one of the slots (13) on the first side in the circumferential direction or disposed on the second side in the circumferential direction relative to the inner wall surface (13*b*) of a second one of the slots (13) on the first side in the circumferential direction. Such an embodiment is able to guide the opening jigs (41) by the ends (71*h*) of the guide portions (71*b*) at least at the openings (13*a*). Each opening (13*a*) is a region through which the radially inner side end and radially outer side end of the associated coil (20) (i.e., an entirety of the associated coil (20)) pass. Accordingly, guiding the opening jigs (41) at the openings (13*a*) makes it possible to effectively prevent the opening jigs (41) from coming into contact with the insulating members (30) disposed in the slots (13).

Effects of Stator Assembling Apparatus

In the present embodiment, an assembling apparatus (200) for a stator (100) includes, as described above, opening jigs (41) structured to be movable to a second side in a radial direction together with coils (20) through regions of slots (13) opposite to inner wall surfaces (13*b*) relative to insulating members (30). The opening jigs (41) open portions (30*a*) of the insulating members (30) on a first side in the radial direction by being inserted into the slots (13). The assembling apparatus (200) for the stator (100) further includes a guide (71) to be disposed adjacent to a stator core (10) in an axial direction of the stator core (10). The guide (71) is provided such that movement of the opening jigs (41) in a circumferential direction is restricted. This makes it possible to prevent the opening jigs (41) from coming into contact with the insulating members (30) disposed in the slots (13). Accordingly, the present embodiment is able to prevent the insulating members (30) from being broken by the opening jigs (41) and prevent the insulating members (30) from being jammed between the opening jigs (41) and teeth (12). Consequently, the present embodiment is able to provide the assembling apparatus (200) for the stator (100), which is capable of preventing occurrence of an insulation failure of the stator (100) resulting from breakage and jamming of the insulating members (30).

In the present embodiment, the guide (71) includes, as described above, guide portions (71*b*) provided such that the guide portions (71*b*) are arranged in the circumferential direction. A first one of the guide portions (71*b*) is provided such that the first one of the guide portions (71*b*) overlaps with the inner wall surface (13*b*) of a first one of the slots (13) on a first side in the circumferential direction as viewed in the axial direction. A second one of the guide portions (71*b*) adjacent to the first one of the guide portions (71*b*) in the circumferential direction is provided such that the second one of the guide portions (71*b*) overlaps with the inner wall surface (13*b*) of the first one of the slots on a second side in the circumferential direction as viewed in the axial direction. Such an embodiment facilitates contact of the opening jigs (41) with the guide portions (71*b*) adjacent to each other in the circumferential direction, making it possible to provide the assembling apparatus (200) for the stator (100), which is capable of more reliably preventing the opening jigs (41) from coming into contact with the insulating members (30).

In the present embodiment, the guide (71) is structured such that a gap (C11) between adjacent ones of the guide portions (71*b*) in the circumferential direction corresponds to a second width (W2) smaller than a first width (W1) that is a width of each slot (13) in the circumferential direction as described above. Thus, each opening jig (41) is guided through the second width (W2) smaller than the first width (W1) of each slot (13), making it possible to provide the assembling apparatus (200) for the stator (100), which is capable of preventing the opening jigs (41) from coming into contact with the insulating members (30) disposed in the slots (13).

In the present embodiment, the guide (71) is structured such that the second width (W2) is equal to or smaller than a difference between the first width (W1) of each slot (13) and a value twice as large as a thickness (t) of each insulating member (30) as described above. Such an embodiment is able to provide the assembling apparatus (200) for the stator (100), which is capable of preventing the opening jigs (41) from coming into contact with the insulating members (30) (or preventing the insulating members (30) from being pressed by the opening jigs (41)) during movement of the opening jigs (41) to the second side in the radial direction more reliably than when the second width (W2), through which each opening jig (41) is to be guided, is larger than the difference between the first width (W1) of each slot (13) and the value twice as large as the thickness (t) of each insulating member (30).

In the present embodiment, the guide (71) is structured such that the second width (W2) is smaller than the difference as described above. Such an embodiment makes it possible to provide the assembling apparatus (200) for the stator (100), which is capable of preventing the opening jigs (41) from coming into contact with the insulating members (30) (or preventing the insulating members (30) from being pressed by the opening jigs (41)) with higher reliability during movement of the opening jigs (41) to the second side in the radial direction.

In the present embodiment, ends (71h) of the guide portions (71b) are disposed closer to the opening jigs (41) than the insulating members (30) on both sides of the opening jigs (41) in the circumferential direction as described above. Such an embodiment makes it possible to provide the assembling apparatus (200) for the stator (100), which is capable of preventing the opening jigs (41) from coming closer to the insulating members (30) than the ends (71h).

In the present embodiment, the ends (71h) of the guide portions (71b) each have a flat shape extending along the axial direction and are provided so as to guide lateral surfaces (41h) of the opening jigs (41) each having a flat shape extending along the axial direction as described above. Such an embodiment guides the flat-shaped lateral surfaces (41h) of the opening jigs (41) by the flat-shaped ends (71h). This makes it possible to provide the assembling apparatus (200) for the stator (100), which is capable of preventing breakage of at least either the ends (71h) or the lateral surfaces (41h), caused by contact between the ends (71h) and the lateral surfaces (41h), more reliably than when at least either the ends (71h) or the lateral surfaces (41h) have corners.

As described above, the present embodiment involves providing the guide portions (71b) such that each guide portion (71b) runs along the associated slot (13) and extends to a region located on the first side in the radial direction relative to the associated slot (13) as viewed in the axial direction. When at least portions of the coils (20) are inserted into the slots (13) from the regions located on the first side in the radial direction relative to the slots (13), such an embodiment makes it possible to insert the coils (20) into the slots (13) while guiding at least portions of the coils (20) by parts of the guide portions (71b) extending to the regions located on the first side in the radial direction relative to the slots (13). Accordingly, the present embodiment is able to insert the coils (20) into the slots (13) more smoothly. Consequently, the present embodiment is able to guide the opening jigs (41) through the slots (13) while guiding the coils (20) through the regions located on the first side in the radial direction relative to the slots (13) by the guide portions (71b).

Variations

The embodiment disclosed herein is to be considered as not limitative but illustrative in all respects. The scope of the present disclosure is defined not by the description of the above embodiment but by the claims and includes all changes (or variations) falling within the meaning and range equivalent to the claims.

For example, the above embodiment has illustrated an example where the width W2 (second width) between adjacent ones of the guide members 71a is smaller than the difference between the width W1 (first width) of each slot 13 and the value twice as large as the thickness t of each insulating sheet 30 (insulating member). The present disclosure, however, is not limited to this example. The width W2 (second width) between adjacent ones of the guide members 71a may be equal to the difference between the width W1 (first width) of each slot 13 and the value twice as large as the thickness t of each insulating sheet 30 (insulating member).

The above embodiment has illustrated an example where the guide members 71a are provided on the end faces (10a, 10b) of the stator core 10 on both sides in the axial direction. The present disclosure, however, is not limited to this example. The guide members 71a may be provided on only either one of the end faces (10a, 10b) of the stator core 10.

The above embodiment has illustrated an example of a method for assembling the stator 100 including the stator core provided on its radially inner side with the openings 13a of the slots 13, and an example of the assembling apparatus 200 for the stator 100. The present disclosure, however, is not limited to these examples. Alternatively, the present disclosure may be applied to a method for assembling a stator including a stator core provided on its radially outer side with openings of slots, and an assembling apparatus for the stator.

The above embodiment has illustrated an example where the insulating member opener 40 is provided with the second opening jigs 42. The present disclosure, however, is not limited to this example. For example, when the width of the stator core 10 in the radial direction is relatively small, the insulating member opener 40 may be provided with no second opening jigs 42, and the radial openings 30a (portions on the first side in the radial direction) of the insulating sheets 30 (insulating members) may be opened by the first opening jigs 41 (opening jigs).

The above embodiment has illustrated an example where the pressers 73 press the coil end portions 22, thus pressing the slot-housed portions 21 continuous with the coil end portions 22 against the first opening jigs 41 (opening jigs). The present disclosure, however, is not limited to this example. For example, when the pressers 73 are structured to be able to directly press the slot-housed portions 21, the slot-housed portions 21 may be pressed by the pressers 73 without pressing the coil end portions 22 by the pressers 73.

The above embodiment has illustrated an example where the guide members 71a are disposed on the end faces (10a, 10b) of the stator core 10, and then the first opening jigs 41 (opening jigs) are inserted into the slots 13 so as to open the insulating sheets 30 (insulating members). The present disclosure, however, is not limited to this example. In another example, the first opening jigs 41 (opening jigs) may be inserted into the slots 13 so as to open the insulating sheets 30 (insulating members), and then the guide members 71a may be disposed on the end faces (10a, 10b) of the stator core 10.

The above embodiment has illustrated an example where the first opening jigs 41 (opening jigs) are inserted into the slots 13 in the axial direction. The present disclosure, however, is not limited to this example. In another example, the first opening jigs 41 (opening jigs) may be inserted into the slots 13 in the radial direction.

The above embodiment has illustrated an example where the first guide 71 (guide) includes more than one guide member 71*a*. The present disclosure, however, is not limited to this example. In another example, the guide may be a one-piece guide.

Figure 22:
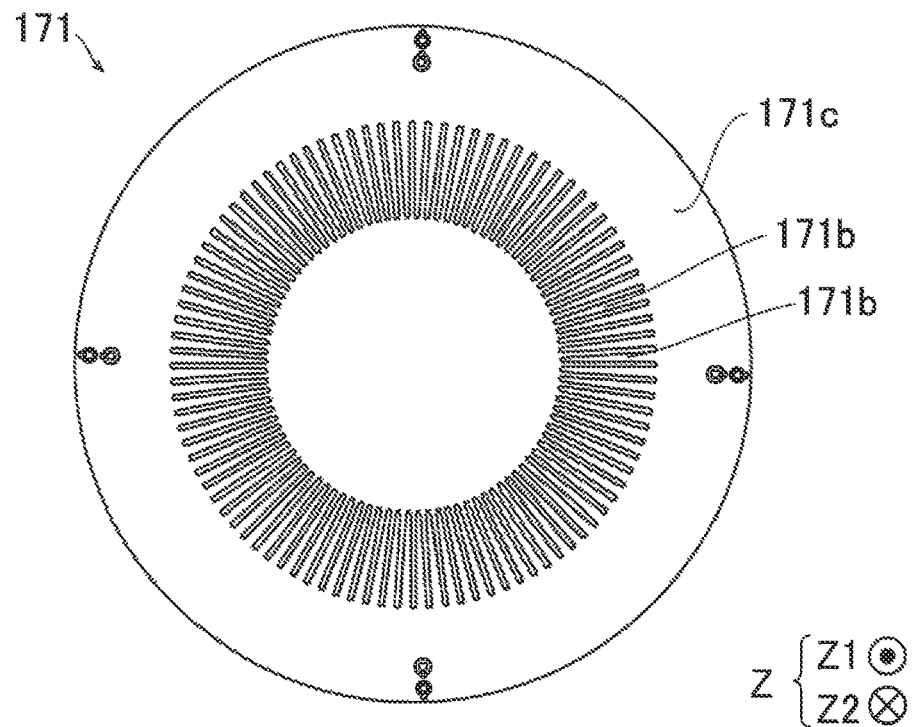
FIG. 22 is a plan view illustrating a structure of a first guide according to a first variation of one embodiment.

As illustrated in FIG. 22, for example, a first guide 171 is a one-piece guide. Specifically, the first guide 171 includes a one-piece radially outer side portion 171*c* having an annular shape, and radially inner side portions 171*b*. The radially inner side portions 171*b* are provided such that the radially inner side portions 171*b* extend to the radially inner side from the radially outer side portion 171*c*.

Figure 23:
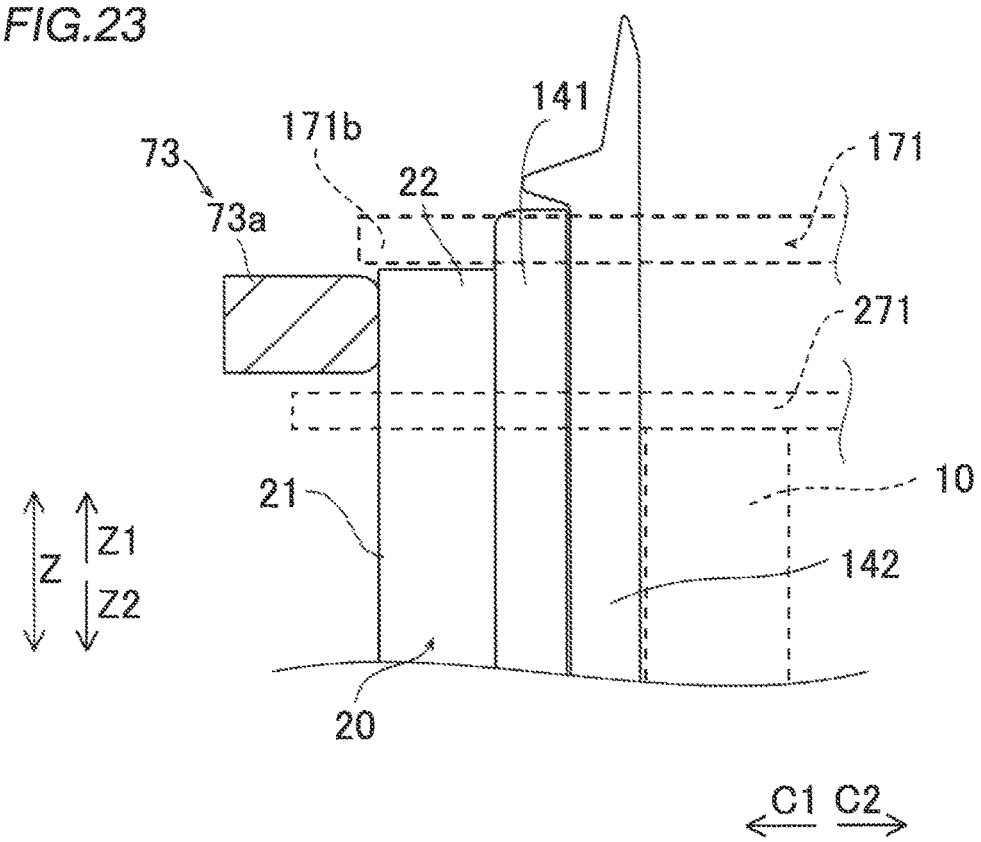
FIG. 23 is a diagram illustrating a location of the first guide according to the first variation of one embodiment.
Figure 24:
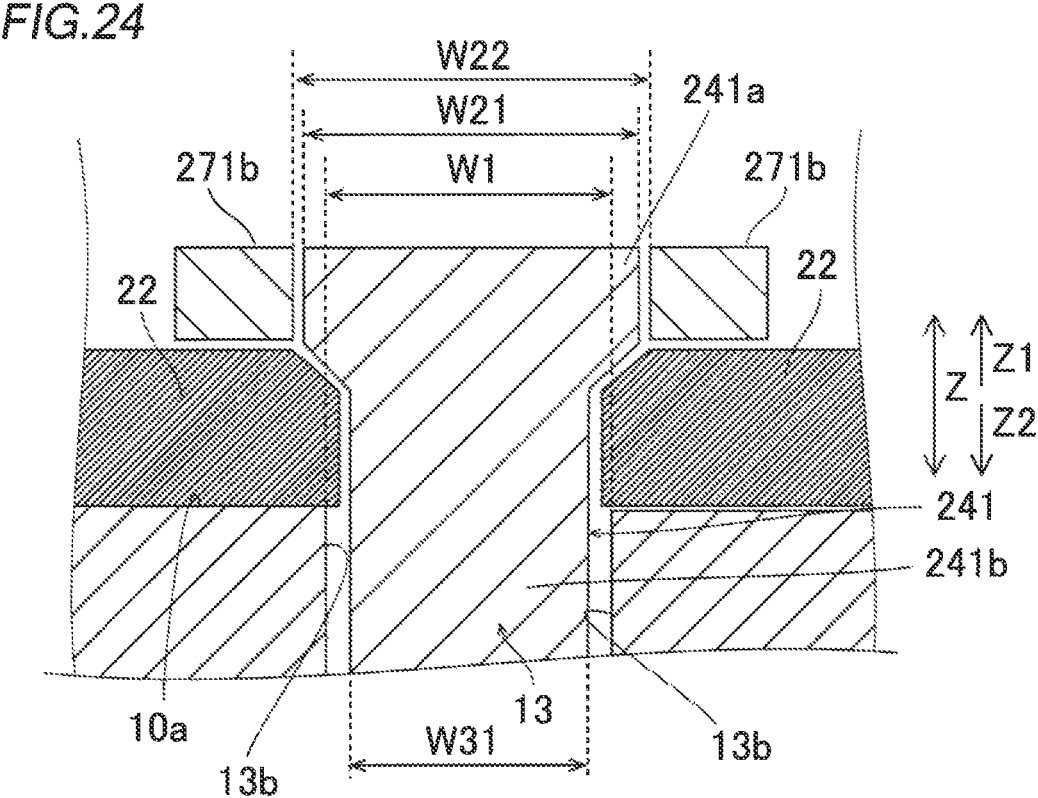
FIG. 24 is a cross-sectional view of radially inner side portions and a first opening jig according to a second variation of one embodiment as viewed in a radial direction.

As illustrated in FIG. 23, the radially inner side portions 171*b* are disposed opposite to the stator core 10 (i.e., in the direction of the arrow Z1 in FIG. 23) in the axial direction relative to the coil end portions 22. In this case, first opening jigs 141 (and second opening jigs 142) to be guided by the first guide 171 are longer in axial length than the first opening jigs 41 (and the second opening jigs 42) according to the above embodiment. In this case, a guide 271 having only the function of guiding the coils 20 is provided instead of the first guide 71 according to the above embodiment. Alternatively, the first guide 171 may be provided instead of the first guide 71 according to the above embodiment. Although only one first guide 171 located in the direction of the arrow Z1 is illustrated in FIG. 23, another first guide 171 located in the direction of the arrow Z2 is also provided. Each first guide 171 is an example of the "guide" in the claims. Each radially inner side portion 171*b* is an example of the "guide portion" in the claims. Each first opening jig 41 is an example of the "opening jig" in the claims.

The present embodiment has illustrated an example where the radially inner side portions 71*b* (guide portions) guide the associated first opening jig 41 (opening jig) through the width W2 smaller than the width W1 of each slot 13 in the circumferential direction. The present disclosure, however, is not limited to this example. The circumferential width through which each first opening jig 41 (opening jig) is to be guided may be equal to or larger than the width W1 of each slot 13.

Specifically, a circumferential width W22 through which each first opening jig 241 (opening jig) is to be guided by associated radially inner side portions 271*b* is larger than the width W1 of each slot 13. In this case, each first opening jig 241 includes an extremity 241*a* to be guided by the associated first opening jigs 241. A circumferential width W21 of each extremity 241*a* is larger than a circumferential width W31 of an intra-slot portion 241*b* of each first opening jig 241 inserted into the associated slot 13. Each radially inner side portion 271*b* is an example of the "guide portion" in the claims. The width W22 is an example of the "second width" in the claims. The width W21 is an example of the "third width" in the claims.

DESCRIPTION OF THE REFERENCE NUMERALS

10 stator core
10*a*, 10*b* end face
11 back yoke
12 teeth
13 slot
13*a* opening
13*b* inner wall surface
20 coil
21 slot-housed portion
30 insulating sheet (insulating member)
30*a* radial opening (portion on first side in radial direction)
41, 141 first opening jig (opening jig)
41*h* lateral surface
71, 171 first guide (guide)
71*b*, 171*b*, 271*b* radially inner side portion (guide portion)
71*h* end
100 stator
200 assembling apparatus
C11 gap
t thickness
W1 width (first width)
W2, W22 width (second width)
W11, W21 width (third width)

The invention claimed is:

1. A method for assembling a stator that includes: a stator core including a back yoke, teeth extending to a first side in a radial direction from the back yoke, and slots each defined between adjacent ones of the teeth and each including an opening on the first side in the radial direction; coils including slot-housed portions each housed in an associated one of the slots; and insulating members each disposed in an associated one of the slots such that the insulating members are located between inner wall surfaces of the slots facing in a circumferential direction and the slot-housed portions, the stator assembling method comprising:

a step of disposing each of the insulating members in an associated one of the slots;

a step of inserting, after the step of disposing the insulating members, opening jigs into the slots such that each insulating member is disposed between the inner wall surface of the associated slot and an associated one of the opening jigs, thus opening a portion of each insulating member on the first side in the radial direction;

a step of disposing a guide such that the guide is adjacent to the stator core in an axial direction of the stator core, the guide restricting movement of the opening jigs in the circumferential direction; and a step of moving, after the step of opening the insulating members, the coils and the opening jigs together to a second side in the radial direction relative to the stator core while guiding the opening jigs such that movement of the opening jigs in the circumferential direction is restricted directly by the guide, thus inserting the slot-housed portions into the slots through the openings, wherein the guide is adjacent to the opening jigs in the circumferential direction such that the guide directly contacts the opening jigs when the opening jigs move in the circumferential direction during the step of moving the coils and the opening jigs together, wherein the step of disposing the guide involves disposing the guide such that guide portions included in the guide are arranged in the circumferential direction, and disposing the guide such that a first one of the guide portions overlaps with the inner wall surface of a first one of the slots on a first side in the circumferential direction as viewed in the axial direction, and such that a second one of the guide portions adjacent to the first one of the guide portions in the circumferential direction overlaps with the inner wall surface of the first one of the slots on a second side in the circumferential direction as viewed in the axial direction, and the step of disposing the guide involves disposing the guide such that a gap between adjacent ones of the guide portions in the circumferential direction corresponds to a second width smaller than a first width that is a width of each slot in the circumferential direction.

2. The stator assembling method according to claim 1, wherein the step of disposing the guide involves disposing the guide such that an end of the first one of the guide portions facing the first one of the slots is disposed at a position corresponding in the circumferential direction to that of the inner wall surface of the first one of the slots on the first side in the circumferential direction or disposed inward of the first one of the slots, thus causing the first one of the guide portions to overlap with the inner wall surface of the first one of the slots on the first side in the circumferential direction as viewed in the axial direction, and such that an end of the second one of the guide portions facing the first one of the slots is disposed at a position corresponding in the circumferential direction to that of the inner wall surface of the first one of the slots on the second side in the circumferential direction or disposed inward of the first one of the slots, thus causing the second one of the guide portions to overlap with the inner wall surface of the first one of the slots on the second side in the circumferential direction as viewed in the axial direction.

3. The stator assembling method according to claim 1, wherein the step of disposing the guide involves disposing the guide such that the second width is equal to or smaller than a difference between the first width of each slot and a value twice as large as a thickness of each insulating member.

4. The stator assembling method according to claim 3, wherein the step of disposing the guide involves disposing the guide such that the second width is smaller than the difference.

5. The stator assembling method according to claim 4, wherein the step of disposing the guide involves disposing the guide such that ends of the guide portions are disposed closer to the opening jigs than the insulating members on both sides of the opening jigs in the circumferential direction.

6. The stator assembling method according to claim 5, wherein the step of inserting the slot-housed portions into the slots involves guiding lateral surfaces of the opening jigs, each having a flat shape extending along the axial direction, by the ends of the guide portions, each having a flat shape extending along the axial direction, thus inserting the slot-housed portions into the slots while guiding the opening jigs such that movement of the opening jigs in the circumferential direction is restricted by the ends.

7. The stator assembling method according to claim 4, wherein
the step of disposing the guide involves disposing the guide such that the second width is smaller than the difference and larger than a third width of each opening jig in the circumferential direction.

8. The stator assembling method according to claim 1, wherein
the step of disposing the guide involves disposing the guide such that the guide is adjacent to the stator core on both sides in the axial direction, and
the step of inserting the slot-housed portions into the slots involves moving the coils and the opening jigs together to the second side in the radial direction relative to the stator core while guiding the opening jigs such that movement of the opening jigs in the circumferential direction is restricted by the guide on both sides in the axial direction, thus inserting the slot-housed portions into the slots through the openings.

9. The stator assembling method according to claim 1, wherein
the step of disposing the guide involves disposing the guide at least on a side of the stator core from which the opening jigs are to be inserted into the slots, and
the step of opening the portions of the insulating members on the first side in the radial direction involves inserting the opening jigs into the slots while guiding the opening jigs by the guide disposed on the side of the stator core, from which the opening jigs are to be inserted into the slots, such that movement of the opening jigs in the circumferential direction is restricted, thus opening the portions of the insulating members on the first side in the radial direction.

10. The stator assembling method according to claim 1, wherein the step of inserting the slot-housed portions into the slots involves moving the coils and the opening jigs together to the second side in the radial direction relative to the stator core while guiding the opening jigs such that movement of the opening jigs in the circumferential direction is restricted by the guide and guiding the coils such that movement of the coils in the circumferential direction is restricted by the guide, thus inserting the slot-housed portions into the slots through the openings.

11. The stator assembling method according to claim 1, wherein the insertion of the opening jigs into the slots involves moving the opening jigs along the axial direction, thus inserting the opening jigs into the slots.

12. An apparatus for assembling a stator that includes: a stator core including a back yoke, teeth extending to a first side in a radial direction from the back yoke, and slots each defined between adjacent ones of the teeth and each including an opening on the first side in the radial direction; coils including slot-housed portions each housed in an associated one of the slots; and insulating members each disposed in an associated one of the slots such that the insulating members are located between inner wall surfaces of the slots facing in a circumferential direction and the slot-housed portions, the stator assembling apparatus comprising:

opening jigs structured to be movable to a second side in the radial direction together with the coils through regions of the slots opposite to the inner wall surfaces relative to the insulating members, the opening jigs opening portions of the insulating members on the first side in the radial direction by being inserted into the slots; and a guide to be disposed adjacent to the stator core in an axial direction of the stator core, wherein
the guide is provided such that movement of the opening jigs in the circumferential direction is restricted directly, wherein the guide is provided to be adjacent to the opening jigs in the circumferential direction such that the guide directly contacts the opening jigs when the opening jigs move in the circumferential direction,
the guide includes guide portions provided such that the guide portions are arranged in the circumferential direction,
a first one of the guide portions is provided such that the first one of the guide portions overlaps with the inner wall surface of a first one of the slots on a first side in the circumferential direction as viewed in the axial direction, and a second one of the guide portions adjacent to the first one of the guide portions in the circumferential direction is provided such that the second one of the guide portions overlaps with the inner wall surface of the first one of the slots on a second side in the circumferential direction as viewed in the axial direction, and the guide is structured such that a gap between adjacent ones of the guide portions in the circumferential direction corresponds to a second width smaller than a first width that is a width of each slot in the circumferential direction.

13. The stator assembling apparatus according to claim 12, wherein the guide is structured such that the second width is equal to or smaller than a difference between the first width of each slot and a value twice as large as a thickness of each insulating member.

14. The stator assembling apparatus according to claim 13, wherein the guide is structured such that the second width is smaller than the difference.

15. The stator assembling apparatus according to claim 14, wherein ends of the guide portions are disposed closer to the opening jigs than the insulating members on both sides of the opening jigs in the circumferential direction.

16. The stator assembling apparatus according to claim 15, wherein the ends of the guide portions each have a flat shape extending along the axial direction and are provided so as to guide lateral surfaces of the opening jigs each having a flat shape extending along the axial direction.

* * * * *